United States Patent
Nakanishi et al.

(10) Patent No.: US 6,947,213 B2
(45) Date of Patent: Sep. 20, 2005

(54) DIFFRACTIVE OPTICAL ELEMENT THAT POLARIZES LIGHT AND AN OPTICAL PICKUP USING THE SAME

(75) Inventors: Hideyuki Nakanishi, Ohtsu (JP); Shoichi Takasuka, Osaka (JP); Shinichi Ijima, Takatsuki (JP); Akio Yoshikawa, Kyotanabe (JP); Teruhiro Shiono, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 16 days.

(21) Appl. No.: 10/774,960

(22) Filed: Feb. 9, 2004

(65) Prior Publication Data

US 2004/0233534 A1 Nov. 25, 2004

Related U.S. Application Data

(62) Division of application No. 09/593,239, filed on Jun. 14, 2000, now Pat. No. 6,728,034.

(30) Foreign Application Priority Data

Jun. 16, 1999 (JP) .......................................... 11-169261
Jun. 16, 1999 (JP) .......................................... 11-169263

(51) Int. Cl.$^7$ .............................................. G02B 5/30
(52) U.S. Cl. ........................ 359/566; 359/569; 359/571; 359/572; 359/576; 385/37
(58) Field of Search ................................ 359/566, 569, 359/571–2, 576, 15; 385/37; 369/112.01

(56) References Cited

U.S. PATENT DOCUMENTS

| | | | | |
|---|---|---|---|---|
| 4,946,253 A | | 8/1990 | Kostuck | 359/15 |
| 5,015,835 A | | 5/1991 | Ohuchida et al. | 350/201.5 |
| 5,363,226 A | * | 11/1994 | Strasser et al. | 359/566 |
| 5,486,934 A | | 1/1996 | Huang | 359/15 |
| 5,561,558 A | * | 10/1996 | Shiono et al. | 359/569 |
| 5,682,255 A | | 10/1997 | Friesem et al. | 359/15 |
| 5,726,805 A | * | 3/1998 | Kaushik et al. | 359/589 |
| 5,745,265 A | | 4/1998 | Hasegawa et al. | 359/15 |
| 5,910,940 A | * | 6/1999 | Guerra | 369/275.1 |
| 2005/0002313 A1 | * | 1/2005 | Hayashi | 369/112.03 |

FOREIGN PATENT DOCUMENTS

| | | |
|---|---|---|
| EP | 866330 | 9/1998 |
| JP | 567345 | 3/1993 |
| JP | 5188208 | 7/1993 |
| JP | 6258534 | 9/1994 |
| JP | 10268066 | 10/1998 |

* cited by examiner

Primary Examiner—Drew A. Dunn
Assistant Examiner—Mark Consilvio

(57) ABSTRACT

A first diffractive optical element pattern with a pattern pitch that is no greater than a wavelength of incident light is formed on a first main surface of substrate such as a glass plate. Second diffractive optical element patterns are formed at positions that are respectively incident to positive first-order diffracted light and negative first-order diffracted light produced by the first diffractive optical element pattern. Negative first-order diffracted light produced by each second diffractive optical element pattern is incident upon a boundary face of the substrate at an angle that is smaller than the critical angle, and so exits the substrate.

9 Claims, 19 Drawing Sheets

DIFFRACTIVE OPTICAL ELEMENT THAT POLARIZES LIGHT AND AN OPTICAL PICKUP USING THE SAME

This is a divisional application of U.S. Ser. No. 09/593,239, filed on Jun. 14, 2000 now U.S. Pat. No. 6,728,034.

BACKGROUND OF THE INVENTION

(1) Field of the Invention

The present invention relates to a diffractive optical element that can be used in a variety of applications, such as in optical information processing equipment and optical communication equipment. In particular, the invention relates to a diffractive optical element that polarizes light.

(2) Related Art

FIG. 1 is a cross-sectional drawing showing the construction of a conventional diffractive optical element 200.

The arrows in FIG. 1 show the courses taken by light rays. This is also the case in the following drawings.

As shown in FIG. 1, the diffractive optical element 200 is composed of a substrate 201 that is made of transparent plate glass and has a diffractive optical element pattern 203 formed on a main surface 202.

The incident light $L_0$ is monochromatic and has the wavelength $\lambda$. When this light strikes the diffractive optical element pattern 203 on the main surface 202 at an angle of 90°, the light will be diffracted as it passes the diffractive optical element pattern 203, producing zero-order diffracted light $L_1$, and positive first-order diffracted light $L_2$ and a negative first-order diffracted light $L_3$ that each form the diffraction angle $\theta_1$ with the light $L_1$.

When it is assumed that the refractive index of the substrate 201 is n (where n>1) and the pattern pitch of the diffractive optical element pattern 203 is $\Lambda$, the value of the diffraction angle $\theta_1$ can be found easily according to Equation 1 below.

$$\theta_1 = \operatorname{Sin}^{-1}\{(\lambda/n)/\Lambda\} \qquad \text{Equation 1}$$

The diffraction angle $\theta_1$ found in this way will usually be below the critical angle for total internal reflection by a surface (to be precise, a boundary face of a main surface) of the substrate 201. As a result, the zero-order light $L_1$, the positive first-order light $L_2$, and negative first-order light $L_3$ all pass through the substrate 201 and exit a main surface 204 on an opposite side to the main surface 202.

Polarization is known to occur when the pattern pitch $\Lambda$ is reduced for the diffractive optical element pattern 203 of this kind of diffractive optical element 200. There are high hopes that this property will enable new kinds of optical elements to be realized.

As Equation 1 clearly shows, reducing the pattern pitch $\Lambda$ of the diffractive optical element pattern 203 to a value that is equal to or smaller than the wavelength $\lambda$ of the incident light will result in an increase in the diffraction angle. This gives rise to the problem of the diffracted light being trapped within the substrate 201.

FIG. 2 shows what happens in this case. A diffractive optical element pattern 303 having a pitch that is no greater than the wavelength of the incident light $L_0$ is formed on a main surface 302 of a diffractive optical element 300. Diffraction caused by the diffractive optical element pattern 303 produces positive first-order diffracted light $L_2$ and negative first-order diffracted light $L_3$ that each form a larger diffraction angle $\theta_2$ than the diffraction angle $\theta_1$ in the case shown in FIG. 1. This diffraction angle $\theta_2$ satisfies the condition for total internal reflection by main surface 304, so that the diffracted beams are completely reflected back into substrate 301.

Total internal reflection occurs whenever these reflected beams reach a main surface of the substrate 301, so that the diffracted light ends up being trapped within the substrate 301.

The following describes the case shown in FIG. 3 where a diffractive optical element pattern 213 is formed on a main surface 214 on an opposite side of a substrate 210 to a main surface 212 that is incident to the incident light $L_0$. In FIG. 3, the pattern pitch $\Lambda$ of the diffractive optical element pattern 213 is greater than the wavelength $\lambda$ of the light $L_0$. In this case, diffraction by the diffractive optical element pattern 213 produces zero-order diffracted light $L_1$, as well positive first-order diffracted light $L_2$ and negative first-order diffracted light $L_3$ that each form a diffraction angle $\theta_3$ with the light $L_1$. This diffraction angle $\theta_3$ can be found using Equation 2 below.

$$\theta_3 = \operatorname{Sin}^{-1}\{(\lambda/\Lambda)\} \qquad \text{Equation 2}$$

As shown in FIG. 3, the zero-order diffracted light $L_1$, the positive first-order diffracted light L2 and the negative first-order diffracted light $L_3$ each pass through the main surface 214 and out of the substrate 211.

However, when a diffractive optical element pattern is formed in this way, there is still the problem of the diffracted light being trapped in the substrate when the pattern pitch $\Lambda$ of the diffractive optical element pattern is smaller than the wavelength $\lambda$ of the incident light.

One example of this case is a diffractive optical element 310 shown in FIG. 4. Diffraction occurs for the incident light $L_0$ that strikes diffractive optical element pattern 313 formed on a main surface 314 of a substrate 311 to produce the zero-order diffracted light $L_1$, the positive first-order diffracted light $L_2$ and the negative first-order diffracted light $L_3$. While the zero-order diffracted light $L_1$ exits the main surface 314, the positive first-order diffracted light $L_2$ and the negative first-order diffracted light $L_3$ do not satisfy the condition for transmittive diffraction, and so are reflected back at a diffraction angle $\theta_4$ that is found by Equation 3 below.

$$\theta_4 = \operatorname{Sin}^{-1}\{(\lambda/n)/\Lambda\} \qquad \text{Equation 3}$$

These diffracted beams are hereafter subjected to total internal reflection by the main surfaces 312 and 314 and so end up being trapped within the substrate 310.

The above problem means that even if a diffractive optical element pattern is capable of polarizing light, the diffracted beams produced by the diffractive optical element pattern will not exit the substrate. This greatly limits the potential of such substrates as optical elements.

An optical pickup provided in a magneto-optical (MO) disk device reads the information stored on an MO disk by shining a laser beam at an information recording surface of the disk and splitting the light reflected off this surface using a polarizing beam splitter (hereinafter, "PBS") in the form of a prism. While doing so, the pickup also obtains servo signals, such as the focus error signal and tracking error signal. A prism-shaped PBS is a relatively large component, and so makes miniaturization of the optical pickup difficult.

SUMMARY OF THE INVENTION

The present invention was conceived in view of the stated problems and has a first object of providing a diffractive optical element where light that has been diffracted by a diffractive optical element pattern exits the diffractive optical element even when a pattern pitch of the diffractive optical element pattern is equal to or smaller than the wavelength of the incident light.

The second object of the present invention is to provide a miniaturized optical pickup that uses a diffractive optical element as a polarizing beam splitter.

The first object of the present invention can be achieved by a diffractive optical element that diffracts incident light, including: a substrate with a first main surface and a second main surface, a refractive index of the substrate being equal to n where n is a value greater than one; a first diffractive optical element pattern that is formed on part of the first main surface with a pattern pitch $\Lambda$ such that $\lambda/n<\Lambda\leq\lambda$, where $\lambda$ is a wavelength of the incident light; and a second diffractive optical element pattern that is formed on one of the first main surface and the second main surface at a predetermined position on an optical path that diffracted light produced by the first diffractive optical element pattern takes within the substrate.

With the above construction, light is incident on the first diffractive optical element pattern that has a pattern pitch that is smaller than the wavelength of the incident light. Even if the light produced by transmittive diffraction or reflective diffraction has a large diffraction angle that satisfies the conditions for total internal reflection at a boundary face of a main surface of the substrate, this diffracted light will be further diffracted by the second diffractive optical element pattern. This lowers the angle at which the diffracted light is incident upon on the boundary face, so that the diffracted light can exit the substrate.

Here, a reflective film maybe provided on a different main surface to the second diffractive optical element pattern at a predetermined position, the reflective film reflecting diffracted light produced by the second diffractive optical element pattern so that the diffracted light passes back through the substrate and then exits the substrate.

With the stated construction, the diffracted light can exit the substrate through the main surface opposite the main surface on which the reflective film is provided.

Here, the pattern pitch $\Lambda'$ of the second diffractive optical element pattern may equal to the pattern pitch $\Lambda$ of the first diffractive optical element pattern.

With the stated construction, the diffracted light produced by the first diffractive optical element pattern can exit the substrate in a same direction as an optical axis of the incident light.

Here, the second diffractive optical element pattern may be composed of slits, each slit having a slanted part when viewed in a cross-section taken in a plane that includes a main optical axis of the incident light and a main optical axis of the diffracted light, the diffracted light being incident on the slanted parts of the slits in the second diffractive optical element pattern.

With the stated construction, the diffracted light produced by the first diffractive optical element pattern will be incident on the slanted parts of each slit in the second diffractive optical element pattern. As the incident angle at the slanted parts is reduced, this angle can be kept below the critical angle. This results in transmittive diffraction of the incident light by the second diffractive optical element pattern, so that the diffracted light can exit the substrate.

Here, wherein the second diffractive optical element pattern may be formed of a plurality of slits that are curved in a plane that is parallel to the main surface on which the second diffractive optical element pattern is formed.

With the stated construction, the second diffractive optical element pattern has a lens effect. This means that the second diffractive optical element pattern can control the diffracted light to produce a parallel beam, a convergent beam or divergent beam which then exits the substrate.

The second object of the present invention can be achieved by an optical pickup that optically reads information that has been recorded on an optical recording medium, including: a laser beam exposing unit, including a light source that emits a laser beam, for focusing the laser beam on an information recording surface of the optical recording medium; a first polarizing beam splitter for splitting light reflected back off the information recording surface into first polarized light and second polarized light that is polarized in a different direction to the first polarized light; and a photoelectric conversion unit for receiving the first polarized light and the second polarized light and converting the first polarized light and the second polarized light into electrical signals, wherein the first polarizing beam splitter includes: a first substrate with a first main surface and a second main surface, a refractive index of the substrate being equal to n where n is a value greater than one; a first diffractive optical element pattern that is formed on part of the first main surface with a pattern pitch $\Lambda$ such that $\lambda/n<\Lambda\leq\lambda$, where $\lambda$ is a wavelength of the reflected light; and a second diffractive optical element pattern that is formed on one of the first main surface and the second main surface at a predetermined position on an optical path that diffracted light produced by the first diffractive optical element pattern takes within the first substrate.

With the stated construction, an optical pickup can be produced with the relatively small diffractive optical element of the present invention in place of the large polarizing beam splitting prism that was conventionally used. Such optical pickup is well suited to miniaturization.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 7A is a vertical cross-section of a diffractive optical element of the first embodiment that further includes a reflective film, while

FIG. 9A is a vertical cross-section of a diffractive optical element of the second embodiment that further includes a reflective film, while

FIG. 12A shows a vertical cross-section of the diffractive optical element of the fourth embodiment, while

FIG. 14A is a vertical cross-section of a diffractive optical element of the fifth embodiment that further includes a reflective film, while

FIG. 16A is a vertical cross-section of a diffractive optical element of the sixth embodiment that further includes a reflective film, while

FIG. 19A shows a vertical cross-section of the diffractive optical element of the eighth embodiment, while

DESCRIPTION OF PREFERRED EMBODIMENTS

The following describes several embodiments of the present invention with reference to the accompanying drawings.

The diffractive optical elements to which present invention relates can be broadly classified into the following two types. The first type of diffractive optical element polarizes the incident light through transmittive diffraction and so is hereinafter referred to as the "transmittive-polarization type". The second type of diffractive optical element polarizes the incident light through reflective diffraction and so is hereinafter referred to as the "reflective-polarization type".

This specification first describes four embodiments (numbered one to four) of the present invention that are transmittive-polarization type diffractive optical elements and then four embodiments (numbered five to eight) that are reflective-polarization type diffractive optical elements. The specification also includes two embodiments (numbered nine and ten) that relate to the construction of an optical pickup that uses a diffractive optical element of the present invention.

First Embodiment

Figure 5:
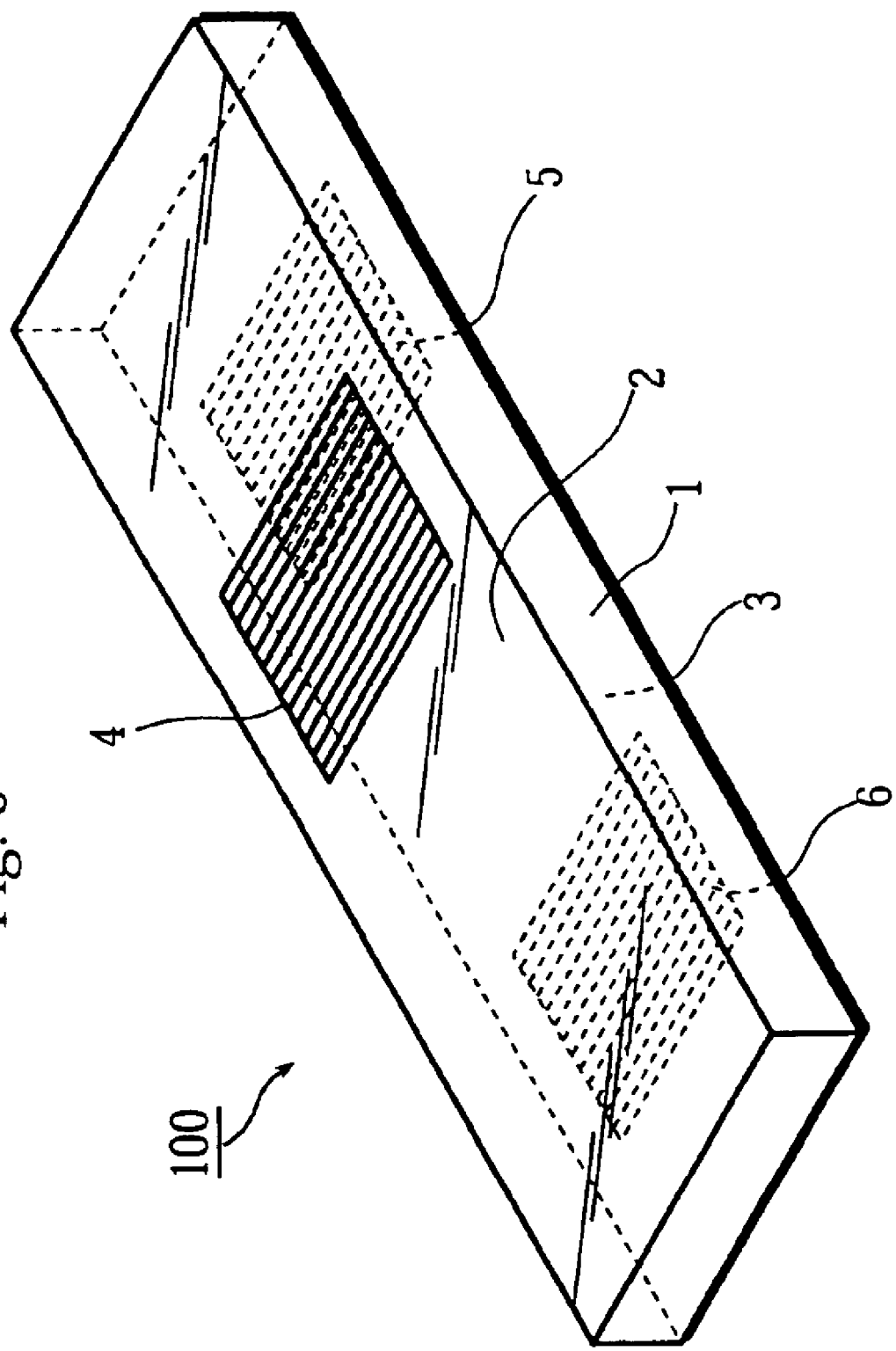
FIG. 5 shows the external appearance of a diffractive optical element that is a first embodiment of the present invention.

FIG. 5 is a perspective drawing showing the external appearance of a transmittive-polarization type diffractive optical element 100 to which the first embodiment of the present invention relates.

As shown in FIG. 5, the diffractive optical element 100 is composed of a substrate 1 that is made of a transparent substance such as glass and has a first diffractive optical element pattern 4 on a main surface 2 and second diffractive optical element patterns 5 and 6 formed on an opposite main surface 3.

The first diffractive optical element pattern 4 and second diffractive optical element patterns 5 and 6 are each composed of slits. The slits in the first diffractive optical element pattern 4 are formed with a rectangular cross-section and a pattern pitch that is no greater than the wavelength λ of the incident light. This kind of pattern can be formed by dry etching, such as by performing reactive ion-beam etching (RIBE) in the presence of chlorine gas. As a diffractive optical element pattern with a pattern pitch this fine will polarize light, such patterns are sometimes referred to hereafter as "polarizing diffractive optical element patterns".

As the diffraction angle θ will not be 90° or higher, the condition $\{(\lambda/n)/\Lambda\}<1$ is given by Equation 1 above. This can be rearranged to give the $(\lambda/n)<\Lambda$. When the pattern pitch of a polarizing diffractive optical element pattern is limited to the range defined by the inequality $\lambda/n<\Lambda\leq\lambda$, where n (n>1) represents the refractive index of the substrate 1.

On the other hand, the second diffractive optical element patterns 5 and 6 formed on the opposite main surface 3 are composed of slits that are also rectangular in cross-section but have a pitch that larger than the wavelength λ of the incident light. These second diffractive optical element patterns 5 and 6 may also be formed by ion-beam etching, or by another method such as plasma etching.

As described later, the second diffractive optical element patterns 5 and 6 redirect the light diffracted by the first diffractive optical element pattern 4 to enable the diffracted light to exit the substrate 1. For this reason, these patterns will also be referred to as "redirecting diffractive optical element patterns".

Figure 6:
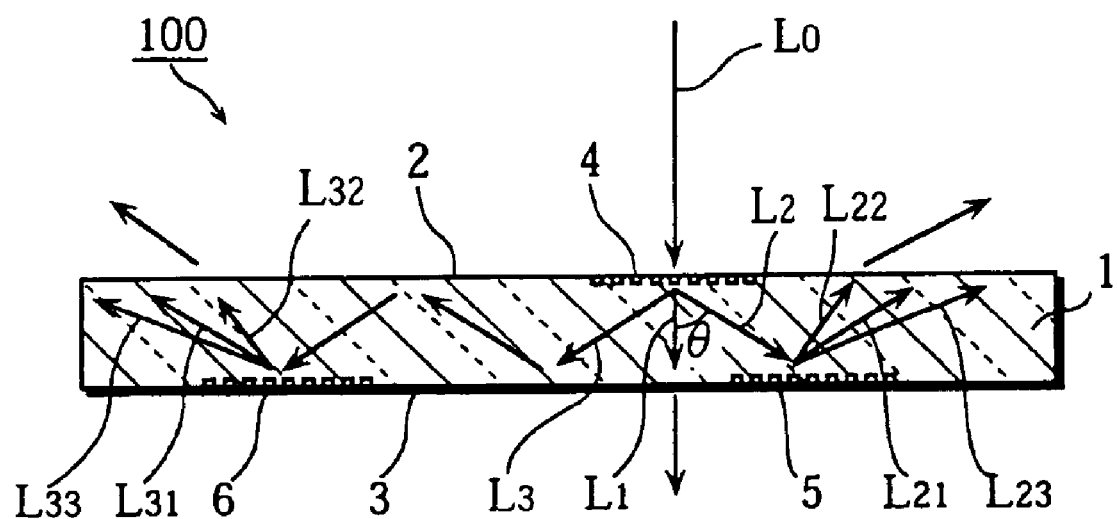
FIG. 6 shows a vertical cross-section of the diffractive optical element of the first embodiment.

FIG. 6 shows the optical paths taken by the light incident on the diffractive optical element 100 and the positional relationship between the diffractive optical element patterns 4, 5 and 6. This figure shows a vertical cross-section of a central part of the diffractive optical element 100 shown in FIG. 5 taken along its length. Note that while the diffraction caused by the diffractive optical element patterns will produce a large number of diffracted beams, for ease of understanding the following explanation will only focus on the zero-order and positive and negative first-order diffractive beams that have the highest intensities.

As shown in FIG. 6, incident light $L_0$ with the wavelength λ strikes the first diffractive optical element pattern 4 perpendicular to the main surface 2 of the substrate 1. The zero-order diffracted light $L_1$ passes through the first diffractive optical element pattern 4 without being redirected, but the positive first-order diffracted light $L_2$ and negative first-order diffracted light $L_3$ are produced in a direction that forms the diffraction angle $\theta$ with the light $L_1$. This diffraction angle $\theta$ is found according to Equation 1 given earlier.

The second diffractive optical element pattern 5 is formed at a first position on an opposite main surface 3 of the substrate 1 struck by the positive first-order diffracted light $L_2$. This second diffractive optical element pattern 5 subjects the diffracted light $L_2$ to reflective-diffraction and so produces the zero-order diffracted light $L_{21}$, the negative first-order diffracted light $L_{22}$ and the positive first-order diffracted light $L_{23}$. Of these diffracted rays, the negative first-order diffracted light $L_{22}$ has an incident angle with the boundary face of the main surface 2 that is below both the diffraction angle $\theta$ and the critical angle, so that this light $L_{22}$ passes through the main surface 2 and exits the substrate 1.

On the other hand, the second diffractive optical element pattern 6 is formed at a position on the opposite main surface 3 of the substrate 1 that is struck by the negative first-order diffracted light $L_3$ after the light $L_3$ has first been subjected to total internal reflection at the boundary face of the main surface 2.

Reflective diffraction by the second diffractive optical element pattern 6 produces the zero-order diffracted light $L_{31}$, the negative first-order diffracted light $L_{32}$ and the positive first-order diffracted light $L_{33}$. Of these diffracted rays, the negative first-order diffracted light $L_{32}$ has an incident angle with the boundary face of the main surface 2 that is below the diffraction angle $\theta$ and the critical angle, so that this light $L_{22}$ passes through the main surface 2 and exits the substrate 1.

As a specific example, assume that the refractive index of the substrate 1 is 2.0, the wavelength $\lambda$ of the incident light $L_0$ is 800 nm, the pattern pitch of the first diffractive optical element pattern 4 is 700 nm, the pattern pitch of the second diffractive optical element patterns 5 and 6 is 2 $\mu$m, and that the incident light $L_0$ strikes the first diffractive optical element pattern 4 almost perpendicular to the main surface 2 of the substrate 1. In this case, the first-order diffraction angle $\theta$ given by Equation 1 will be 34.85°.

Figure 1:
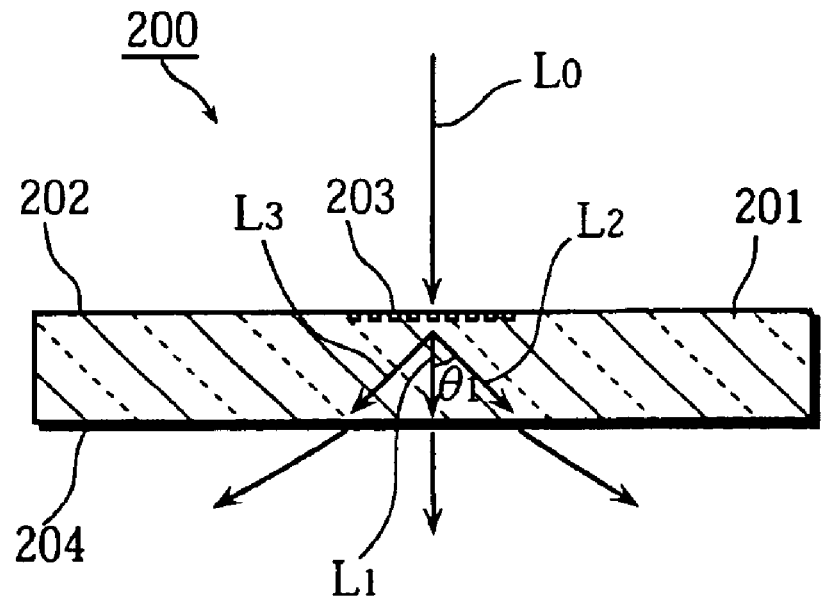
FIG. 1 shows a vertical cross-section of a conventional diffractive optical element.
Figure 2:
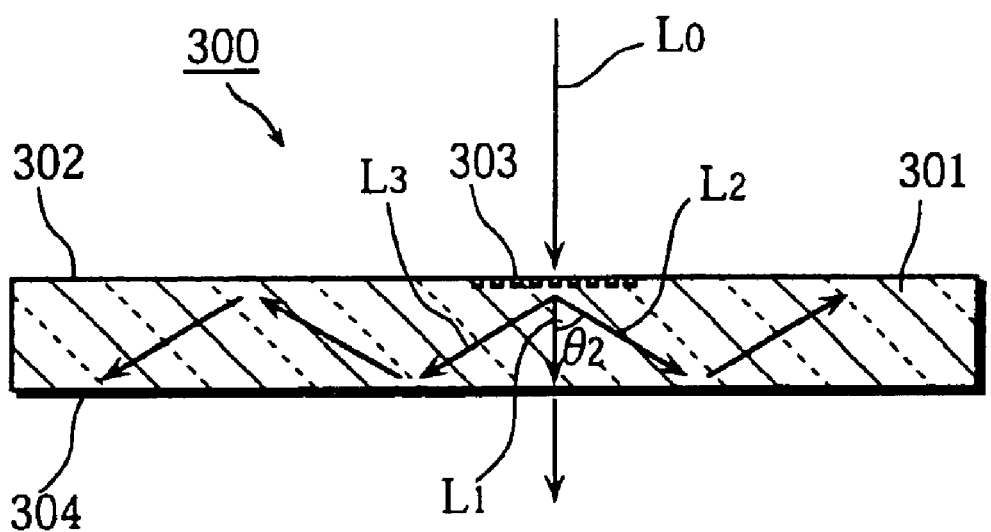
FIG. 2 shows the optical paths taken by light in the diffractive optical element shown in FIG. 1 when the pattern pitch of the diffractive optical element pattern is no greater than the wavelength of the incident light.
Figure 3:
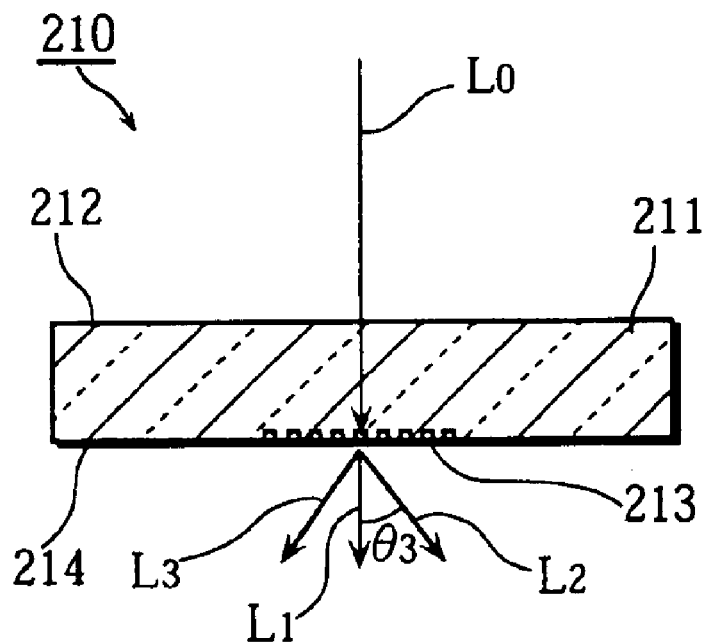
FIG. 3 shows a vertical cross-section of another conventional diffractive optical element.
Figure 4:
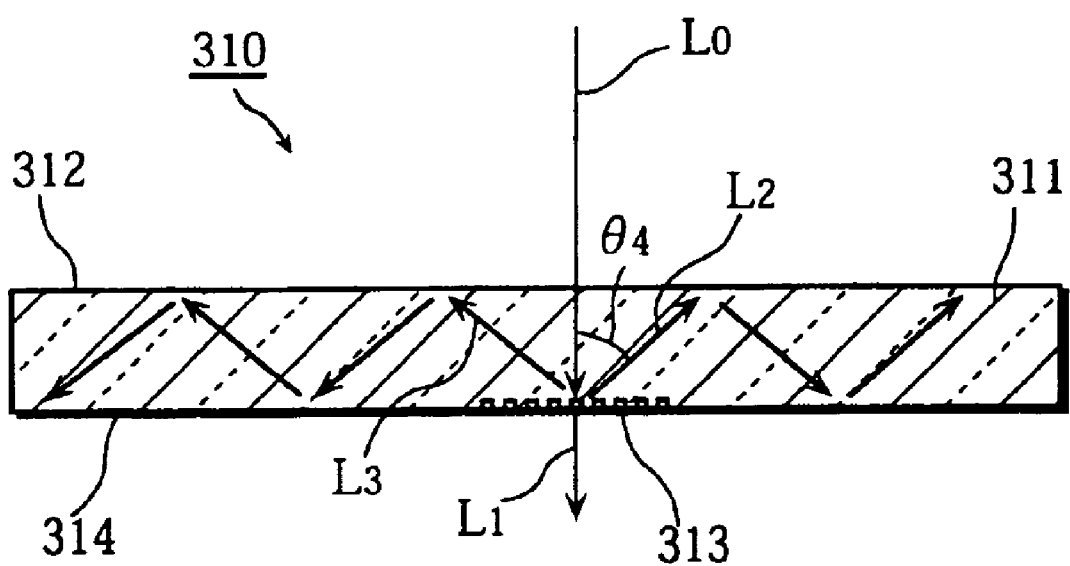
FIG. 4 shows the optical paths taken by light in the diffractive optical element shown in FIG. 3 when the pattern pitch of the diffractive optical element pattern is no greater than the wavelength of the incident light.

With the construction of a conventional diffractive optical element (see FIG. 2), the incident light $L_0$ that strikes the first diffractive optical element pattern 4 is diffracted to produce zero-order diffracted light $L_1$, positive first-order diffracted light $L_2$ and negative first-order diffracted light $L_3$. As the diffraction angle formed by the positive first-order diffracted light $L_2$ and the negative first-order diffracted light $L_3$ satisfies the conditions for total internal reflection (i.e., is 30° or higher for a substrate with a refractive index of 2.0), the lack of the second diffractive optical element patterns 5 and 6 will result in none of the diffracted light exiting the substrate 1.

By providing the second diffractive optical element patterns 5 and 6 on the opposite main surface 3 of the substrate 1, the first-order diffracted light produced by the first diffractive optical element pattern 4 can be polarized to enable the diffracted light to exit the substrate 1.

In more detail, the second diffractive optical element patterns 5 and 6 respectively cause diffraction for the positive first-order diffracted light $L_2$ and the negative first-order diffracted light $L_3$, thereby producing the zero-order diffracted light $L_{21}$ and $L_{31}$, the negative first-order diffracted light $L_{22}$ and $L_{32}$ and the positive first-order diffracted light $L_{23}$ and $L_{33}$. While the zero-order diffracted light $L_{21}$ and $L_{31}$ are reflected off the second diffractive optical element patterns 5 and 6 with an angle equal to the incident angle (34.85°) of the positive first-order diffracted light $L_2$ and the negative first-order diffracted light $L_3$, the negative first-order diffracted light $L_{22}$ and $L_{32}$ are diffracted with a lower angle (21.80°). The positive first-order diffracted light $L_{23}$ and $L_{33}$ are diffracted with a higher angle (50.48°) than the incident angles of the positive and negative first-order diffracted light $L_2$ and $L_3$.

As a result, the second diffractive optical element patterns 5 and 6 reflect the negative first-order diffracted light $L_{22}$ and $L_{32}$ at an angle that is below the critical angle, enabling this light to pass through the main surface 2 and to exit the substrate 1.

The first diffractive optical element pattern 4 has a polarizing property, so that the zero-order diffracted light $L_1$, the positive first-order diffracted light $L_2$ and the negative first-order diffracted light $L_3$ are polarized in different directions. The negative first-order diffracted light $L_{22}$ and $L_{32}$ exit the substrate 1 with a different polarizing direction to the zero-order diffracted light $L_1$, meaning that the present diffractive optical element 100 functions as a polarizing beam splitter.

Note that the same effect can be obtained if the second diffractive optical element patterns 5 and 6 are formed at positions shifted so that the diffracted light $L_2$ and $L_3$ is incident having first been subjected to total internal reflection one or more times within the substrate 1. Every time the diffracted light is subjected to total internal reflection however, some loss occurs in intensity. There is also a tendency for disturbances in the wavefront, so that it is best to limit the number of times the diffracted light is reflected. This is also the case for the following embodiments.

Figure 7A:
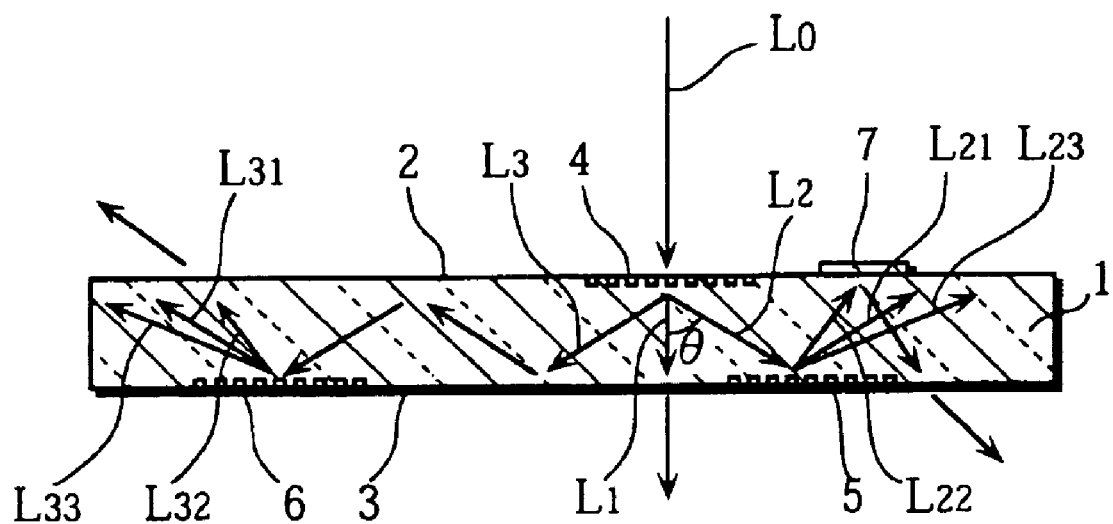
Figure 7B:
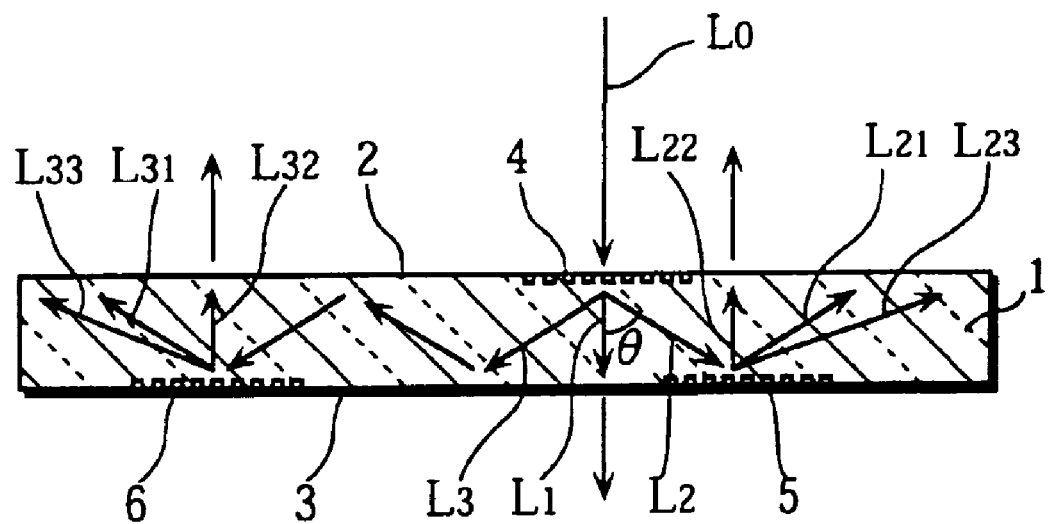
FIG. 7B shows the optical paths taken by diffracted light when the pattern pitch of each diffractive optical element pattern is the same in the diffractive optical element of the first embodiment.

FIGS. 7A and 7B shows modifications of the diffractive optical element 100 shown in FIG. 6.

The diffractive optical element shown in FIG. 7A includes a reflective film 7 that is formed of metal, a multilayer dielectric, or the like. This reflective film 7 is positioned on the main surface 2 of the substrate 1 so as to be incident to the negative first-order diffracted light $L_{22}$ produced by the second diffractive optical element pattern 5, and can be formed by sputtering, for example.

With this construction, the negative first-order diffracted light $L_{22}$ produced by the second diffractive optical element pattern 5 is reflected by the reflective film 7 and so is able to pass through the opposite main surface 3 and exit the substrate 1. This increases the freedom with which an apparatus including this diffractive optical element can be designed. Naturally, a reflective film may also be provided on the main surface 2 at a position that is incident to the negative first-order diffracted light $L_{32}$ produced by the second diffractive optical element pattern 6.

As shown in FIG. 7B, when the second diffractive optical element pattern 5 and 6 are produced with the same pattern pitch as the first diffractive optical element pattern 4, the negative first-order diffracted light $L_{22}$ and $L_{32}$ will be diffracted with a diffraction angle that is equal to the diffraction angle $\theta$ of the first diffractive optical element pattern 4. As a result, the diffracted light $L_{22}$ and $L_{32}$ exit the substrate 1 perpendicular to the main surface 2. The diffracted light $L_{22}$ and $L_{32}$ propagate in a direction that is parallel to the optical axis of the incident light $L_0$, which makes this optical element very easy to use.

Second Embodiment

Figure 8:
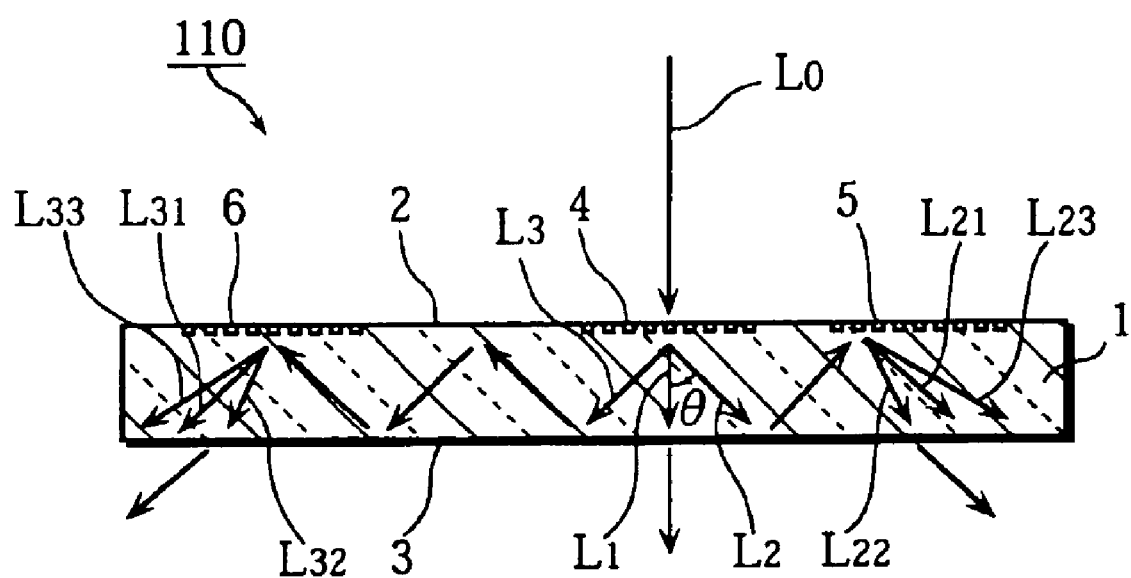
FIG. 8 shows a vertical cross-section of the diffractive optical element of the second embodiment.

FIG. 8 shows the construction of the diffractive optical element 110 of the second embodiment of the present invention. Unlike the diffractive optical element 100 of the first embodiment, this diffractive optical element 110 has the first diffractive optical element pattern 4 and the second diffractive optical element patterns 5 and 6 formed on the same main surface (main surface 2) of the substrate 1. Many construction elements are the same as those in the first embodiment, so that these have been given the same reference numerals as before and their explanation has been omitted.

As shown in FIG. 8, the diffractive optical element 110 is composed of a substrate 1 that has a polarizing first diffractive optical element pattern 4 on a main surface 2 and light-projecting second diffractive optical element patterns 5 and 6 positioned on the same main surface 2 so as to be incident to diffracted light that is produced by the first diffractive optical element pattern 4 and has been subjected to total internal reflection one or three times.

As a specific example, assume that the refractive index of the substrate 1 is 2.0, the wavelength $\lambda$ of the incident light $L_0$ is 800 nm, the pattern pitch of the first diffractive optical element pattern 4 is 700 nm, the pattern pitch of the second diffractive optical element patterns 5 and 6 is 2 $\mu$m, and that the incident light $L_0$ is strikes the first diffractive optical element pattern 4 almost perpendicular to the main surface 2 of the substrate 1. In this case, the first-order diffraction angle $\theta$ given by Equation 1 will be 34.85°. The incident light $L_0$ that strikes the first diffractive optical element pattern 4 is diffracted to produce zero-order diffracted light $L_1$, positive first-order diffracted light $L_2$ and a negative first-order diffracted light $L_3$. As the diffraction angle formed by the positive first-order diffracted light $L_2$ and the negative first-order diffracted light $L_3$ satisfies the conditions for total internal reflection (i.e., the angle is 30° or greater for a substrate with a refractive index of 2.0), the lack of a second diffractive optical element patterns 5 and 6 would result in none of the diffracted light exiting the substrate 1.

In this embodiment, the second diffractive optical element patterns 5 and 6 are provided on the main surface 2 so as to be incident to diffracted rays produced by the first diffractive optical element pattern 4 after total internal reflection off the boundary face of the opposite main surface 3. As a result, the positive first-order diffracted light $L_2$ is diffracted to produce the zero-order diffracted light $L_{21}$, the negative first-order diffracted light $L_{22}$, and the positive first-order diffracted light $L_{23}$. Of these, the zero-order diffracted light $L_{21}$ will be propagated at an angle of 34.85° that is equal to the incident angle of the positive first-order diffracted light $L_2$ on the second diffractive optical element pattern 6. However, the negative first-order diffracted light $L_{22}$ is propagated with a lower angle (21.80°) and the positive first-order diffracted light $L_{23}$ is diffracted with a higher angle (50.48°) than the incident angle of the positive first-order diffracted light $L_2$.

As a result, the negative first-order diffracted light $L_{22}$ is propagated by the second diffractive optical element pattern 5 at an angle that is within the critical angle, which means that this light passes through the opposite main surface 3 and exits the substrate 1.

In the same way, the negative first-order diffracted light $L_3$ is subjected to total internal reflection three times within the opposite main surface 3 before being striking the second diffractive optical element pattern 6. This light $L_3$ is diffracted to produce the zero-order diffracted light $L_{31}$, the negative first-order diffracted light $L_{32}$, and the positive first-order diffracted light $L_{33}$. Of these, the negative first-order diffracted light $L_{32}$ is propagated at an angle within the critical angle, and so passes through the opposite main surface 3 and exits the substrate 1.

Note that the diffracted light can be subjected to total internal reflection inside the substrate 1 five or a higher odd number of times. The higher the number, the further the second diffractive optical element patterns will be positioned from the first diffractive optical element pattern 4.

By forming the second diffractive optical element patterns 5 and 6 at suitable positions, first-order diffracted light that has been subjected to total internal reflection within the substrate 1 an odd number of times can be emitted from the same side of the substrate 1 as the zero-order diffracted light.

Figure 9A:
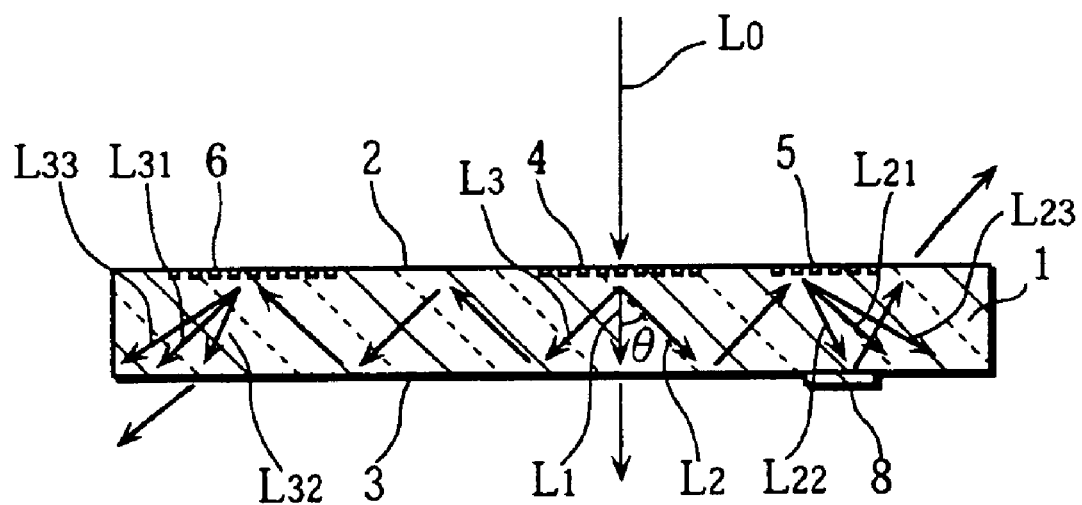

The diffractive optical element shown in FIG. 9A includes a reflective film 8 that is formed of metal, a multilayer dielectric, or the like. This reflective film 8 is positioned on the opposite main surface 3 of the substrate 1 so as to be incident to the negative first-order diffracted light $L_{22}$ produced by the second diffractive optical element pattern 5. The reflective film 8 reflects the negative first-order diffracted light $L_{22}$ so that this light $L_{22}$ is emitted from the main surface 2 of the substrate 1.

Figure 9B:
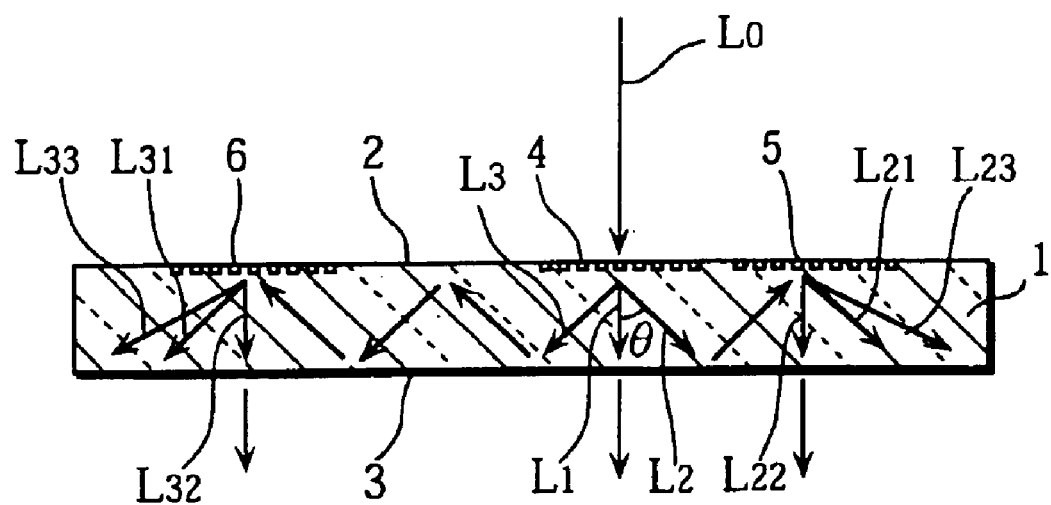
FIG. 9B shows the optical paths taken by diffracted light when the pattern pitch of each diffractive optical element pattern is the same in the diffractive optical element of the second embodiment.

As shown in FIG. 9B, when the second diffractive optical element pattern 5 and 6 are produced with the same pattern pitch as the first diffractive optical element pattern 4 and the incident light $L_0$ is perpendicular to the main surface 2, the negative first-order diffracted light $L_{22}$ and $L_{32}$ produced by the second diffractive optical element patterns 5 and 6 will be diffracted with a diffraction angle that is equal to the diffraction angle $\theta$ of the first diffractive optical element pattern 4. As a result, the diffracted light $L_{22}$ and $L_{32}$ are emitted from the opposite main surface 3 of the substrate 1 perpendicular to this opposite main surface 3. The diffracted light $L_{22}$ and $L_{32}$ propagate in a direction that is parallel to the optical axis of the incident light $L_0$, which makes this optical element very easy to use.

Third Embodiment

Figure 10:
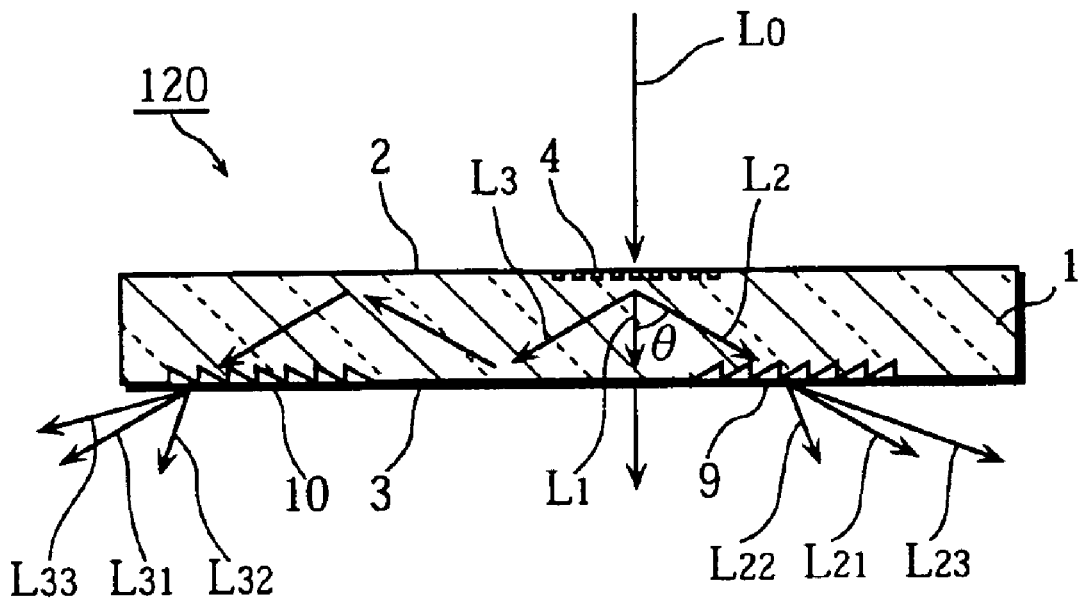
FIG. 10 shows a vertical cross-section of the diffractive optical element of the third embodiment.

FIG. 10 shows the construction of a diffractive optical element 120 of the third embodiment of the present invention.

As shown in FIG. 10, the diffractive optical element 120 is composed of a substrate 1 that has a polarizing first diffractive optical element pattern 4 on a main surface 2 and light-projecting second diffractive optical element patterns 9 and 10 on an opposite main surface 3. These second diffractive optical element patterns 9 and 10 are positioned so as to be either directly incident to diffracted light that is produced by the first diffractive optical element pattern 4 or incident to the diffracted light after it has been subjected to total internal reflection by the main surfaces two times. These second diffractive optical element patterns 9 and 10 are made up of slits that are triangular in cross-section and so will hereafter be referred to as "sawtooth patterns".

Figure 11:
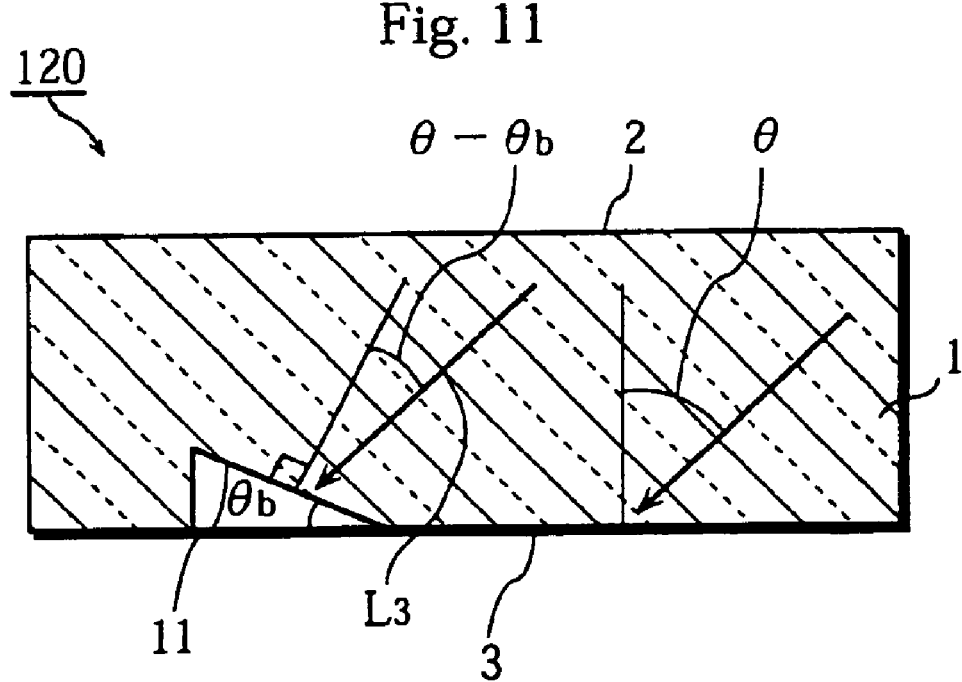
FIG. 11 shows an enlarged cross-section of a principal part of the diffractive optical element of the third embodiment.

FIG. 11 is an enlargement of one of the slits that composes the second diffractive optical element pattern 10. As shown in the drawing, a slanting surface 11 forms an angle of $\theta_b$ with an opposite main surface 3 of the substrate 1, thereby forming a slit that the diffracted light strikes from behind.

As a specific example, assume that the refractive index of the substrate 1 is 2.0, the wavelength $\lambda$ of the incident light $L_0$ is 800 nm, the pattern pitch of the first diffractive optical element pattern 4 is 700 nm, and that the incident light $L_0$ is strikes the first diffractive optical element pattern 4 almost perpendicular to the main surface 2 of the substrate 1. In this case, the first-order diffraction angle $\theta$ given by Equation 1 will be 34.85°. The incident light $L_0$ that strikes the first diffractive optical element pattern 4 is diffracted to produce zero-order diffracted light $L_1$, positive first-order diffracted light $L_2$ and negative first-order diffracted light $L_3$. As the diffraction angle formed by the positive first-order diffracted light $L_2$ and the negative first-order diffracted light $L_3$ satisfies the conditions for total internal reflection (i.e., the angle is 30° or greater for a substrate with a refractive index of 2.0), the lack of a second diffractive optical element patterns 9 and 10 would result in none of the diffracted light exiting the substrate 1.

However, sawtooth patterns are formed as the second diffractive optical element patterns 9 and 10. The slanting surfaces 11 in these sawtooth patterns are provided at the angle $\theta_b$, so that the incident angle at the boundary surface of each slanting surface 11 is $(\theta-\theta_b)$. If the diffraction angle is 34.85° and the critical angle is 30°, setting the angle $\theta_b$ of each slanting surface 11 higher than 4.85° lowers the angle at which the diffracted light is incident to the slanting surface 11 to below the critical angle.

By forming the second diffractive optical element patterns 9 and 10 as sawtooth patterns as shown in FIG. 10, the diffracted light $L_{21}$ to $L_{23}$ and $L_{31}$ to $L_{33}$ produced by the second diffractive optical element patterns 9 and 10 diffracting the positive first-order diffracted light $L_2$ and the negative first-order diffracted light $L_3$ from the first diffractive optical element pattern 4 can be emitted from the substrate 1. This means that less light is lost in this embodiment than in the preceding embodiments.

It should be obvious that the same effect of the increased emission of diffracted light can be obtained by forming the sawtooth patterns for the second diffractive optical element patterns 9 and 10 at any positions on the main surface 2 or opposite main surface 3 that are incident to diffracted light produced by the first diffractive optical element pattern 4 after total internal reflection two or more times by the main surfaces of the substrate 1.

While FIG. 11 shows the cross-section of the slits in the second diffractive optical element patterns 9 and 10 as a right-angled triangle, this does not need to be case and the diffracted light can be emitted from the substrate 1 provided a slanting surface 11 is provided where the diffracted light from the first diffractive optical element pattern 4 is incident on the second diffractive optical element patterns 9 and 10.

The main surface on which the second diffractive optical element patterns 9 and 10 are formed does not need to be parallel to the main surface on which the polarizing first diffractive optical element pattern 4 is formed. When the incident light $L_0$ is perpendicular to the substrate 1 as shown in FIG. 10, the slanting surface 11 of each slit in the second diffractive optical element patterns 9 and 10 only needs to form an angle $\theta_b$ with a direction perpendicular to the angle of incidence of the incident light $L_0$.

Fourth Embodiment

Figure 12A:
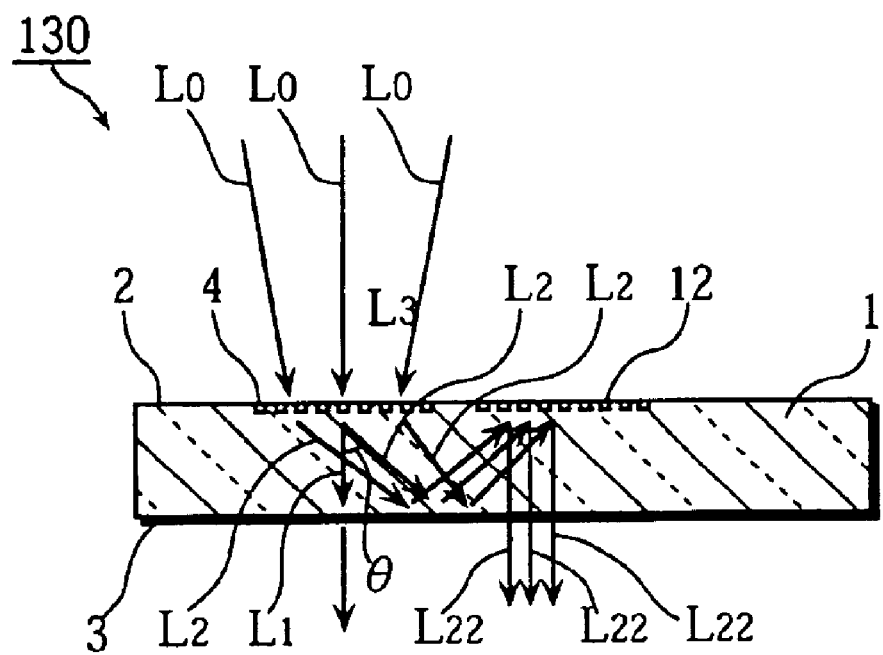
Figure 12B:
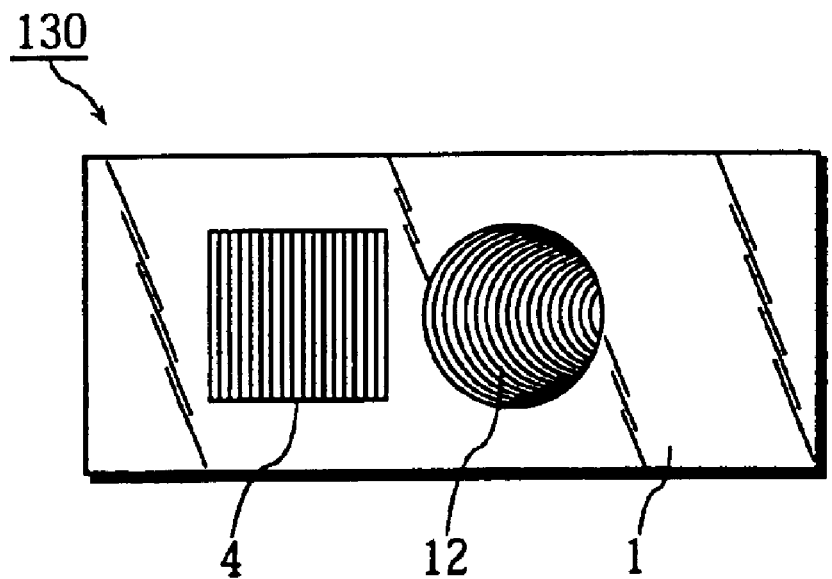
FIG. 12B is an overhead view of the diffractive optical element shown in FIG. 12A.

FIG. 12A is a cross-section of a diffractive optical element 130 that is a fourth embodiment of the present invention. FIG. 12B is an overhead view of this diffractive optical element 130.

This fourth embodiment is characterized by having a second diffractive optical element pattern for redirecting the diffracted light that also functions as a lens.

As shown in FIG. 12A, a polarizing first diffractive optical element pattern 4 is formed on a main surface 2 of a substrate 1. A second diffractive optical element pattern 12 that acts as a lens is also formed on the main surface 2 at a position so as to be incident to the positive first-order diffracted light $L_2$ that has been reflected back off the opposite main surface 3 once.

As shown in the overhead view given in FIG. 12B, the second diffractive optical element pattern 12 is formed of a group of curved slits in a pattern that resembles the shell of a clam. In this example, the second diffractive optical element pattern 12 is designed so as to act as a collimating lens for convergent light.

When, as shown in FIG. 12A, the incident light $L_0$ is convergent light, the positive first-order diffracted light $L_2$ produced by the first diffractive optical element pattern 4 will also be convergent light which strikes the second diffractive optical element pattern 12 after being subjected to total internal reflection at the boundary of the opposite main surface 3. As mentioned above, the second diffractive optical element pattern 12 acts as a collimating lens, with the pattern and pitch of this second diffractive optical element pattern 12 being set so that the positive first-order diffracted light $L_2$ produced by the first diffractive optical element pattern 4 is diffracted to produce negative first-order diffracted light $L_{22}$ which is a parallel beam.

Forming diffractive optical element patterns using curved slits to obtain certain lens effects is well known in the art. However, by using certain settings for the shape and pattern pitch of the slits, it is possible to make the second diffractive optical element pattern 12 function in a variety of ways, such as a concave or convex lens. By doing so, a parallel beam, a divergent beam or a convergent beam can be obtained as desired.

It should be obvious that the same effects can be obtained by forming a set of curved slits for the second diffractive optical element pattern 12 on the main surface 2 or opposite main surface 3 at a position that is directly incident to the diffracted light produced by the first diffractive optical element pattern 4 or at a position that is incident to diffracted light that has been subjected to total internal reflection two or more times.

Fifth Embodiment

The diffractive optical elements of the fifth and sixth to eighth embodiments of the present invention are reflective-polarization type diffractive optical elements. While the first to fourth embodiments describe transmittive-polarization type diffractive optical elements that are each provided with a polarizing diffractive optical element pattern on a main surface where the incident light $L_0$ first strikes the substrate, the polarizing diffractive optical element patterns of this and the following embodiments are formed on an opposite main surface to the main surface where the incident light strikes the substrate. This forms the only difference, so that much of the preceding explanation also applies to the following embodiments. Accordingly, these embodiments are described in brief.

Note that the fifth to eighth embodiments respectively correspond to the first to fourth embodiments.

Figure 13:
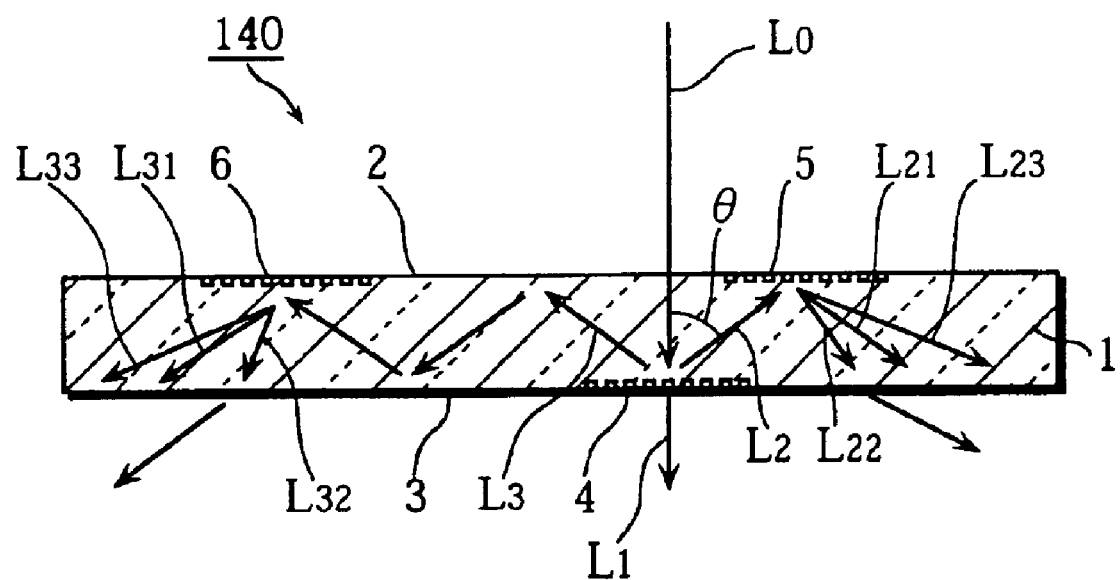
FIG. 13 shows a vertical cross-section of the diffractive optical element of the fifth embodiment.

FIG. 13 is a vertical cross-section of a reflective-type diffractive optical element 140 of the fifth embodiment of the present invention.

As shown in FIG. 13, the diffractive optical element 140 is composed of a substrate 1 that has a first diffractive optical element pattern 4 formed on a main surface 3 and second diffractive optical element patterns 5 and 6 formed on an opposite main surface 2. The second diffractive optical element patterns 5 and 6 are positioned so as to be directly incident to the diffracted light produced by the first diffractive optical element pattern 4 or incident to the diffracted light after it has been subjected to total internal reflection twice.

When the incident light $L_0$ is perpendicular to the main surface 2 of the substrate 1, reflective diffraction by the first diffractive optical element pattern 4 on the opposite main surface 3 produces the positive first-order diffracted light $L_2$ and the negative first-order diffracted light $L_3$. Of these, the positive first-order diffracted light $L_2$ strikes the second diffractive optical element pattern 5, while the negative first-order diffracted light $L_3$ strikes the second diffractive optical element pattern 6 after being subjected to total internal reflection twice.

As described in the preceding embodiments, the negative first-order diffracted light $L_{22}$ and $L_{32}$ respectively produced by the second diffractive optical element patterns 5 and 6 have an incident angle with the boundary surface of the main surface 3 that is within the critical angle, so that the diffracted light $L_{22}$ and $L_{32}$ exits the main surface 3.

With the reflective-diffraction type construction of the present embodiment, the zero-order diffracted light $L_1$, the positive first-order diffracted light $L_2$ and the negative first-order diffracted light $L_3$ can all exit the same side of the substrate 1.

As the diffraction angle θ will not be 90° or higher for a reflective-polarization type diffractive optical element, the condition {(λ/n)/Λ}<1 given by Equation 3 above will hold (when n is the refractive index of the substrate 1). This can be rearranged to show that (λ/n)<Λ so that the pattern pitch Λ of a polarizing diffractive optical element pattern is limited to the range defined by the inequality λ/n<Λ=λ in this case also.

Figure 14A:
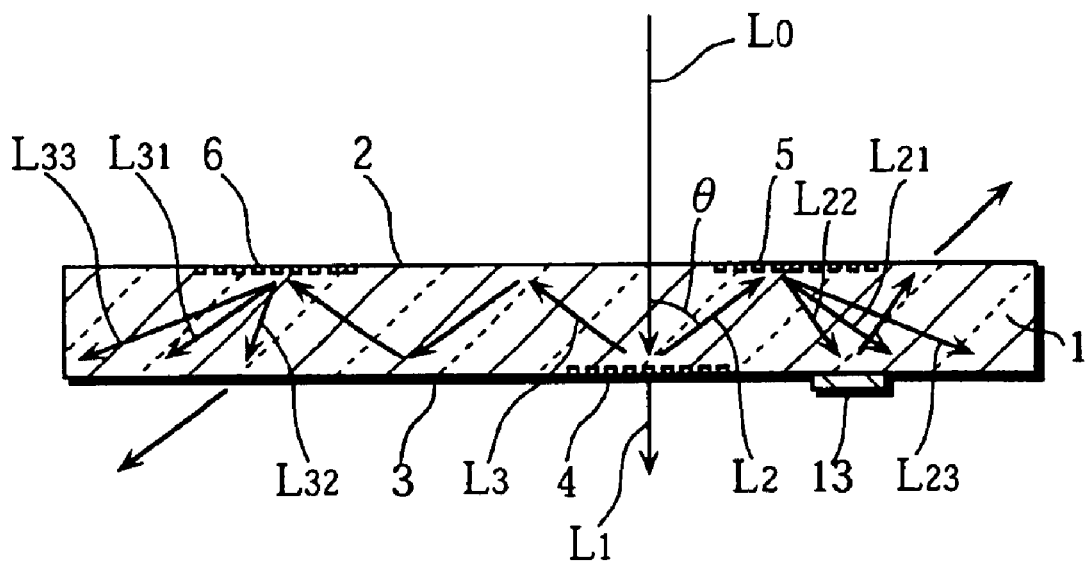

The diffractive optical element shown in FIG. 14A includes a reflective film 13 that is formed of metal, a multilayer dielectric, or the like. This reflective film 14 is positioned on the main surface 3 of the substrate 1 so as to be incident to the negative first-order diffracted light $L_{22}$ produced by the second diffractive optical element pattern 6, and can be formed by sputtering, for example. This results in the negative first-order diffracted light $L_{22}$ being emitted from the main surface 2.

Figure 14B:
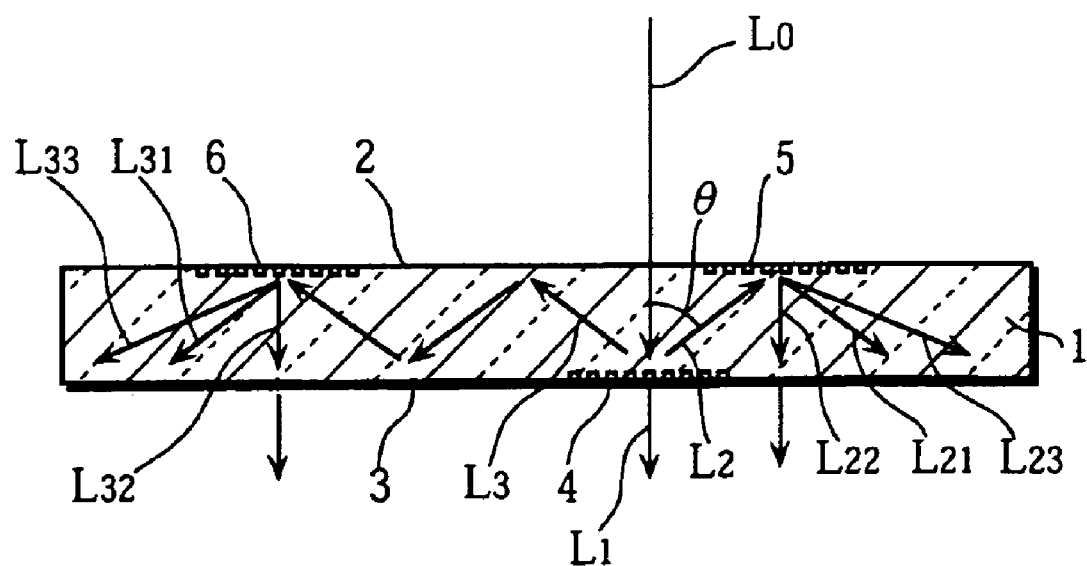
FIG. 14B shows the optical paths taken by diffracted light when the pattern pitch of each diffractive optical element pattern is the same in the diffractive optical element of the fifth embodiment.

As shown in FIG. 14B, when the second diffractive optical element pattern 5 and 6 are produced with the same pitch as the first diffractive optical element pattern 4, the negative first-order diffracted light $L_{22}$ and $L_{32}$ will be diffracted with a diffraction angle that is equal to the diffraction angle θ of the first diffractive optical element pattern 4. As a result, the diffracted light $L_{22}$ and $L_{32}$ exit the substrate 1 perpendicular to the main surface 2. As in FIG. 7B for the first embodiment, the diffracted light $L_{22}$ and $L_{32}$ propagate in a direction that is parallel to the optical axis of the incident light $L_0$, which makes this optical element very easy to use.

Sixth Embodiment

Figure 15:
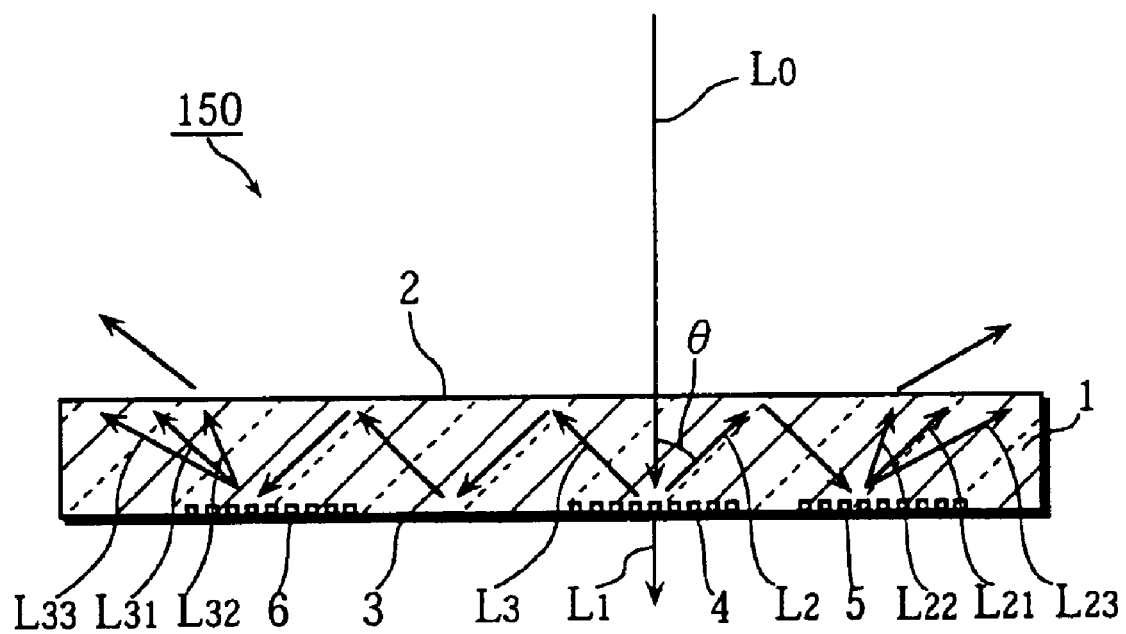
FIG. 15 shows a vertical cross-section of the diffractive optical element of the sixth embodiment.

FIG. 15 is a cross-section of a diffractive optical element 150 that is a sixth embodiment of the present invention.

As shown in FIG. 15, the diffractive optical element 150 is characterized by having the second diffractive optical element patterns 5 and 6 for redirecting diffracted light formed on the same side (main surface 3) of the substrate 1 as the polarizing first diffractive optical element pattern 4. In this way, the present embodiment corresponds to the second embodiment that was shown in FIG. 8.

By positioning the second diffractive optical element patterns 5 and 6 so as to be incident to the positive first-order diffracted light $L_2$ and the negative first-order diffracted light $L_3$ produced by the first diffractive optical element pattern 4, the diffracted light can be emitted from the substrate 1 in the same way as in FIG. 8.

The present embodiment describes the case where the second diffractive optical element pattern 5 is positioned so as to be incident to the positive first-order diffracted light $L_2$ produced by the first diffractive optical element pattern 4 after the light $L_2$ has been subjected to total internal reflection once. The second diffractive optical element pattern 6 is positioned so as to be incident to the negative first-order diffracted light $L_3$ after the light $L_3$ has been subjected to total internal reflection three times. However, these second diffractive optical element patterns 5 and 6 may be positioned so as to be incident to diffracted light that has been reflected five or a higher odd number of times.

Figure 16A:
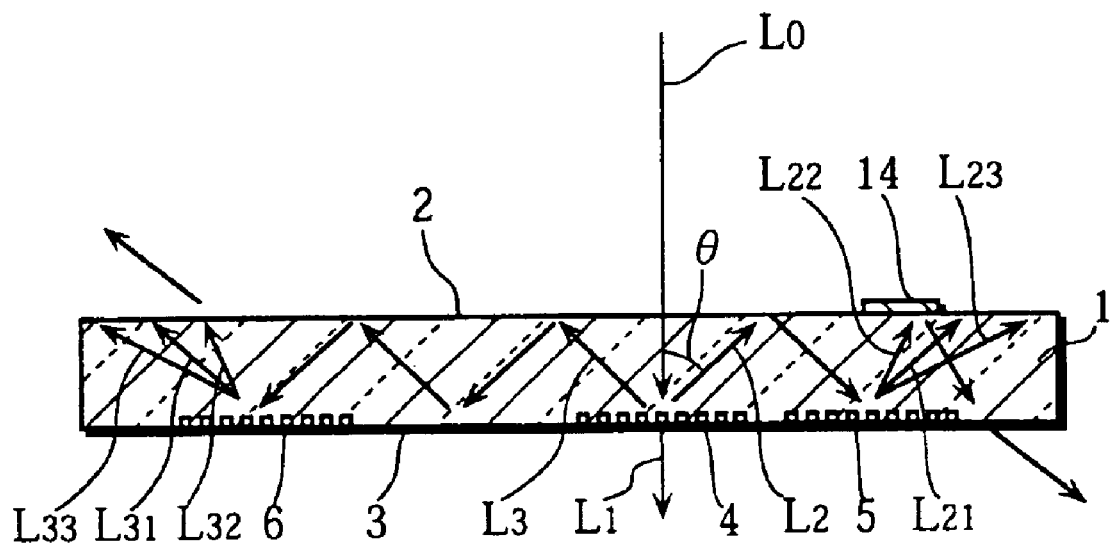

The diffractive optical element shown in FIG. 16A includes a reflective film 14 that is formed of metal, a multilayer dielectric, or the like. This reflective film 14 is positioned on the main surface 2 of the substrate 1 so as to be incident to the negative first-order diffracted light $L_{22}$ produced by the second diffractive optical element pattern 5. This results in the negative first-order diffracted light $L_{22}$ being reflected off the reflective film 14 and exiting the main surface 3.

Figure 16B:
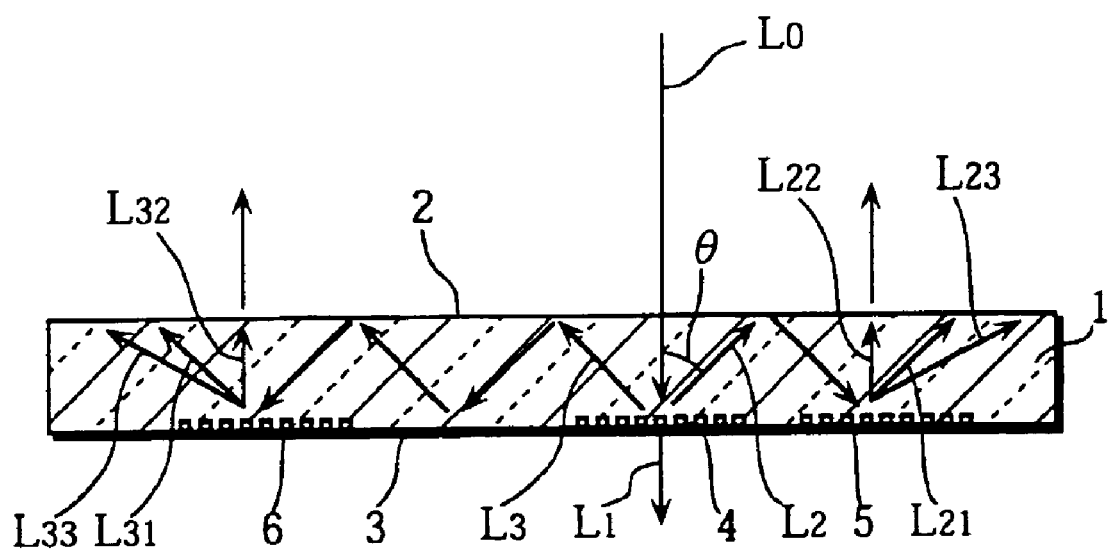
FIG. 16B shows the optical paths taken by diffracted light when the pattern pitch of each diffractive optical element pattern is the same in the diffractive optical element of the sixth embodiment.

As shown in FIG. 16B, when the second diffractive optical element pattern 5 and 6 are produced with the same pattern pitch as the first diffractive optical element pattern 4, the negative first-order diffracted light $L_{22}$ and $L_{32}$ will be diffracted with a diffraction angle that is equal to the angle θ with which the light is reflection-diffracted by the first diffractive optical element pattern 4. As a result, the diffracted light $L_{22}$ and $L_{32}$ exit the substrate 1 in a direction that is parallel to the optical axis of the incident light $L_0$.

Seventh Embodiment

Figure 17:
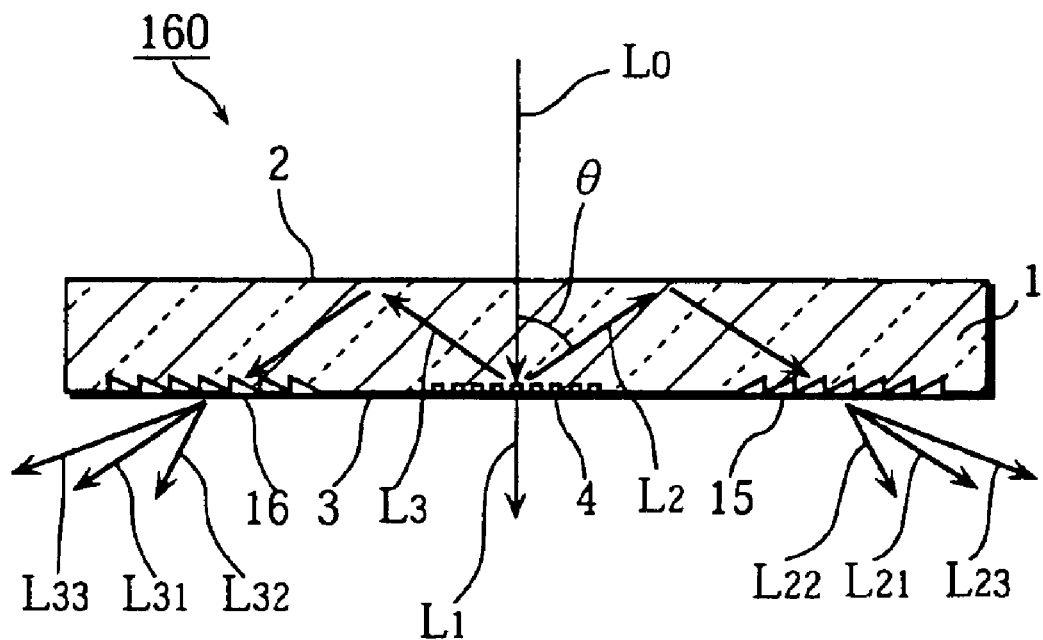
FIG. 17 shows a vertical cross-section of the diffractive optical element of the seventh embodiment.

FIG. 17 is a cross-section of a diffractive optical element 160 that is a seventh embodiment of the present invention. As shown in FIG. 17, the diffractive optical element 160 is characterized by having second diffractive optical element patterns 15 and 16 formed on the either side of a polarizing first diffractive optical element pattern 4 on a main surface 3 of a substrate 1. These second diffractive optical element patterns 15 and 16 are positioned so as to be incident to light that has been reflection-diffracted by the first diffractive optical element pattern 4 after such light has been subjected to total internal reflection once by a main surface 2 of the substrate 1. As shown in the drawing, the second diffractive optical element patterns 15 and 16 are formed as sawtooth patterns in cross-section, so that this embodiment corresponds to the third embodiment shown in FIG. 10.

Figure 18:
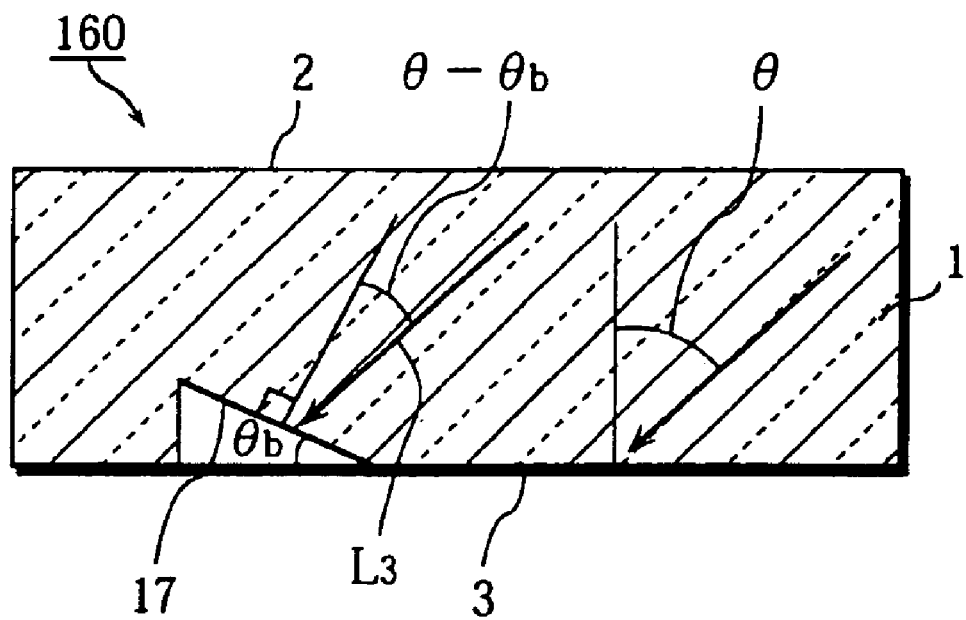
FIG. 18 shows an enlarged cross-section of a principal part of the diffractive optical element of the seventh embodiment.

FIG. 18 shows an enlargement of one of the triangular slits in the second diffractive optical element pattern 16. As shown in the drawing, the diffracted light that strikes the slanting surface 17 in the triangular slit has an incident angle of $\theta - \theta_b$. By setting the angle $\theta_b$ at an appropriate value, the diffracted light becomes incident at an angle that is within the critical angle and so exits the substrate 1.

It should be obvious that the same effects can be obtained if the second diffractive optical element patterns 15 and 16 are positioned so as to be incident to diffracted light from the first diffractive optical element pattern 4 that has been subjected to total internal reflection within the substrate 1 three or a higher odd number of times.

Eighth Embodiment

Figure 19A:
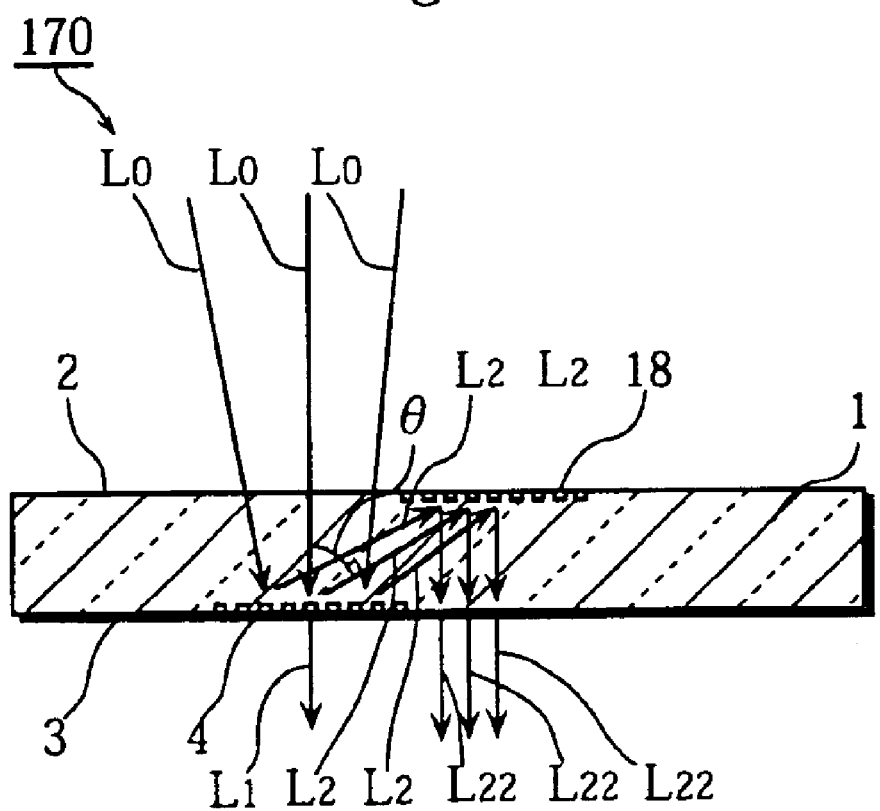
Figure 19B:
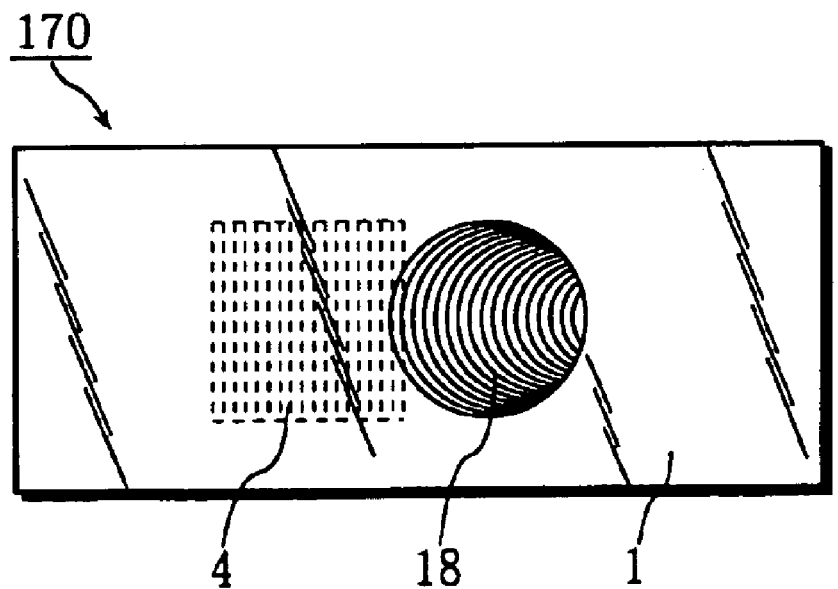
FIG. 19B is an overhead view of the diffractive optical element shown in FIG. 19A.

FIG. 19A shows a cross-section of a diffractive optical element 170 that is an eighth embodiment of the present invention, while FIG. 19B shows an overhead view of this diffractive optical element 170.

As shown in FIG. 19A, a polarizing first diffractive optical element pattern 4 is formed on a main surface 3 of a substrate 1. A second diffractive optical element pattern 18 that acts as a lens is also formed on an opposite main surface 2 at a position so as to be incident to the positive first-order diffracted light that has been reflection-diffracted by the first diffractive optical element pattern 4. As shown in FIG. 19B, the second diffractive optical element pattern 18 is formed of a group of curved slits. In this way, this eighth embodiment corresponds to the fourth embodiment that was shown in FIGS. 12A and 12B.

The second diffractive optical element pattern 18 is formed of a group of curved slits in a pattern that resembles the shell of a clam. As a result, the second diffractive optical element pattern 18 acts as a collimating lens for convergent light, in the same way as the second diffractive optical element pattern 12 shown in FIG. 12A.

When the incident light $L_0$ is convergent light, the positive first-order diffracted light $L_2$ that is produced by the reflective-diffraction of the first diffractive optical element pattern 4 and is incident on the second diffractive optical element pattern 18 will also be convergent light. As the second diffractive optical element pattern 18 is formed of a group of curved lines so as to have a desired lens effect, the first-order negative diffracted light $L_{22}$ produced by the second diffractive optical element pattern 18 can be emitted as a parallel beam, as shown in FIG. 19A. Here, it is possible to make the second diffractive optical element pattern 18 function in a variety of ways, such as a concave or convex lens. By doing so, a parallel beam, a divergent beam or a convergent beam can be obtained as desired.

It should be obvious that the same effects can be obtained by forming a set of curved slits for the second diffractive optical element pattern 18 on the main surface 3 at a position that is incident to the diffracted light produced by the first diffractive optical element pattern 4 after this diffracted light has been subjected to total internal reflection one or more times.

Ninth Embodiment

The following describes an optical pickup that is used in a magnetic-optical disk device and includes the polarizing diffractive optical element 100 described above. Before that however, the construction of a conventional optical pickup and principles used when detecting a recorded signal will be explained in brief.

Figure 20:
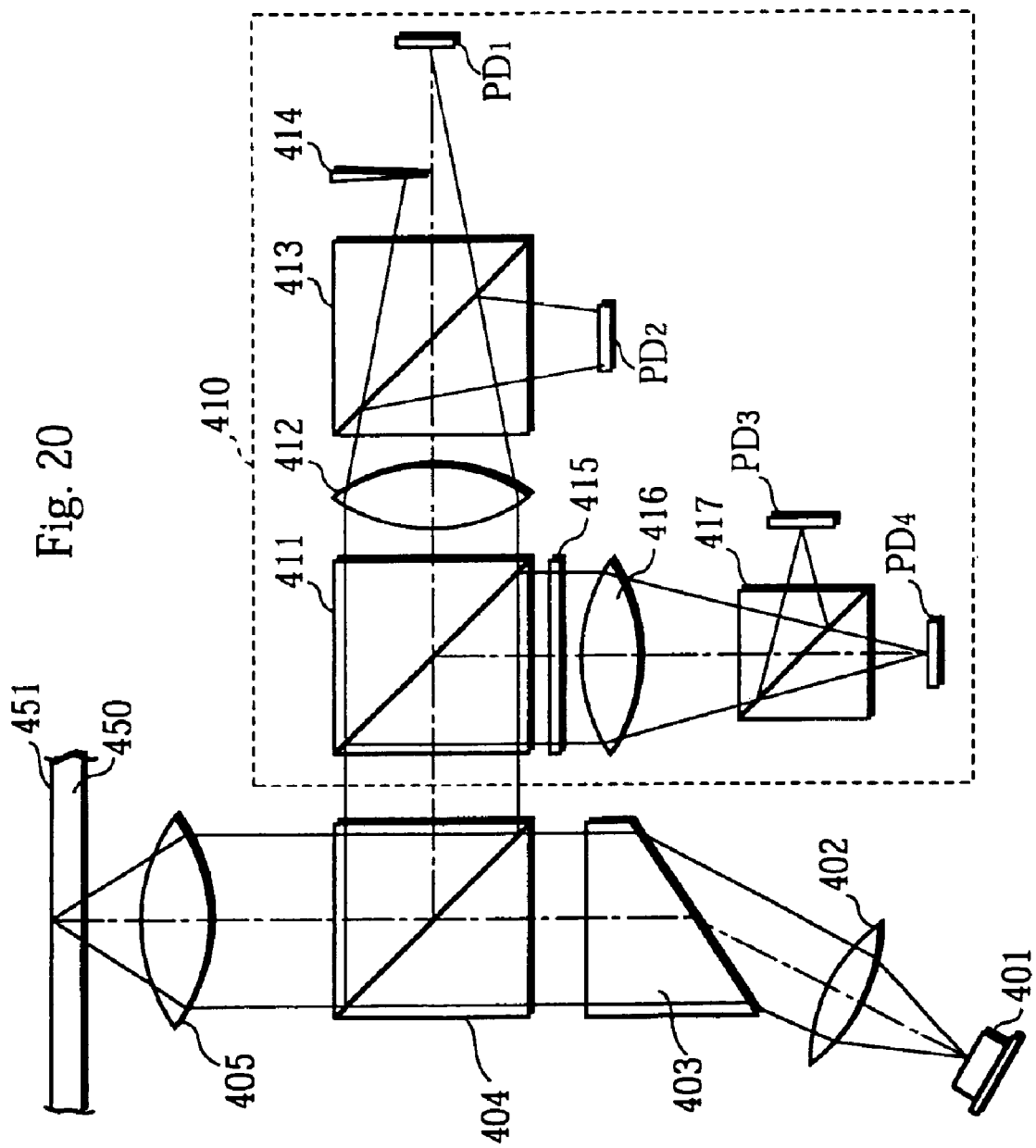
FIG. 20 shows a construction of a conventional optical pickup.

FIG. 20 shows one example of the construction of a conventional optical pickup.

The illustrated optical pickup includes a laser diode 401, a collimating lens 402, a beam-shaping prism 403, a polarizing beam splitter 404, an objective lens 405, and a return light detecting unit 410. The return light detecting unit 410 includes a first half prism 411, a condenser lens 412, a second half prism 413, a knife edge 414, a polarizing beam splitter 417, and photo sensors $PD_1$ to $PD_4$.

A laser beam emitted by the laser diode 401 is converted to a parallel beam by the collimating lens 402 and passes through the beam-shaping prism 403 where it is shaped into a beam whose cross-section is approximately circular. This beam then strikes the polarizing beam splitter 404.

The polarizing beam splitter 404 has its reflectivity for S-polarized light set at 100%, and its transmittance for P-polarized light set at 40 to 60%. As the laser beam emitted by the laser diode 401 is P-polarized light, the polarizing beam splitter 404 transmits around half of this incident light, which then passes through the objective lens 405 and is focused on the information recording surface 451 of the magneto-optical disk 450.

The light (hereafter "return light") that is reflected back off the information recording surface 451 passes back into the polarizing beam splitter 404 where it is reflected towards the return light detecting unit 410.

The return light that reaches the return light detecting unit 410 is split into two beams by the first half prism 411, with the beam that passes straight through the first half prism 411 being used to obtain servo tracking signals for adjusting the tracking and focusing by the optical pickup. On the other hand, the beam that is reflected by the first half prism 411 is used for detecting the signal recorded on the magneto-optical disk 450. The beam that is used to obtain the servo tracking signals is converted into a convergent beam by the condenser lens 412 and is split into two beams by the second half prism 413. The beam that passes straight through the second half prism 413 has its upper part obstructed by the knife edge 414 before striking the sensor surface of the two-zone photo sensor $PD_1$. By doing so, the focus error can be detected by a conventional knife-edge method.

The incident light that is reflected by the second half prism 413 strikes the photo sensor $PD_2$ which is also a two-zone sensor. This enables the tracking error to be detected according to a conventional push-pull method. The two types of servo signals obtained in this way are used to drive a driving mechanism (not illustrated) that includes a magnetic coil and a magnet. By adjusting the focus and tracking in this way, the optical pickup can correctly read the information recorded on the information recording surface 451.

The return light that is reflected by the first half prism 411 is detected by the photo sensors $PD_3$ and $PD_4$ to detect the signal recorded on the magneto-optical disk 450. As is conventionally known, the polarizing direction of the return light that is reflected back off the information recording surface 451 of a magneto-optical disk 450 is rotated by a certain angle (called the Kerr angle) due to the Kerr effect. The light that is reflected by the first half prism 411 and used to detect the recorded signal first passes through a half wavelength plate 415. This half wavelength plate 415 adjusts the incident light that has been rotated by the Kerr angle to align the polarizing direction with a direction that best facilitates separation by the polarizing beam splitter 417. After this, the light is converted to a convergent beam by the condenser lens 416 and is split into P-polarized light and S-polarized light by the polarizing beam splitter 417.

The separated light beams are respectively detected by the photo sensors $PD_3$ and $PD_4$. Finding the difference in the detected values enables noise to be removed, so that the recorded signal can be obtained very accurately.

The conventional optical pickup shown in FIG. 20 includes a return light detecting unit 410 that includes many components, which raises the cost of the components used in the optical pickup and the cost of assembly. Beam splitters that are in the form of prisms are also relatively large components, so that there is the further problem of such pickups being unsuited to miniaturization.

In view of these problems, the inventors of the present invention conceived a miniaturized optical pickup that uses the diffractive optical element described above.

Figure 21B:
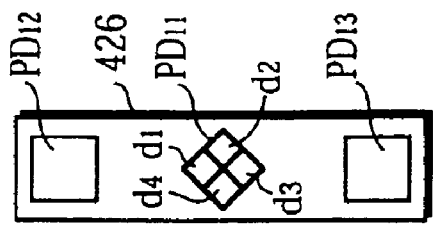
FIG. 21 shows a construction of an optical pickup that is an embodiment of the present invention.
Figure 21A:
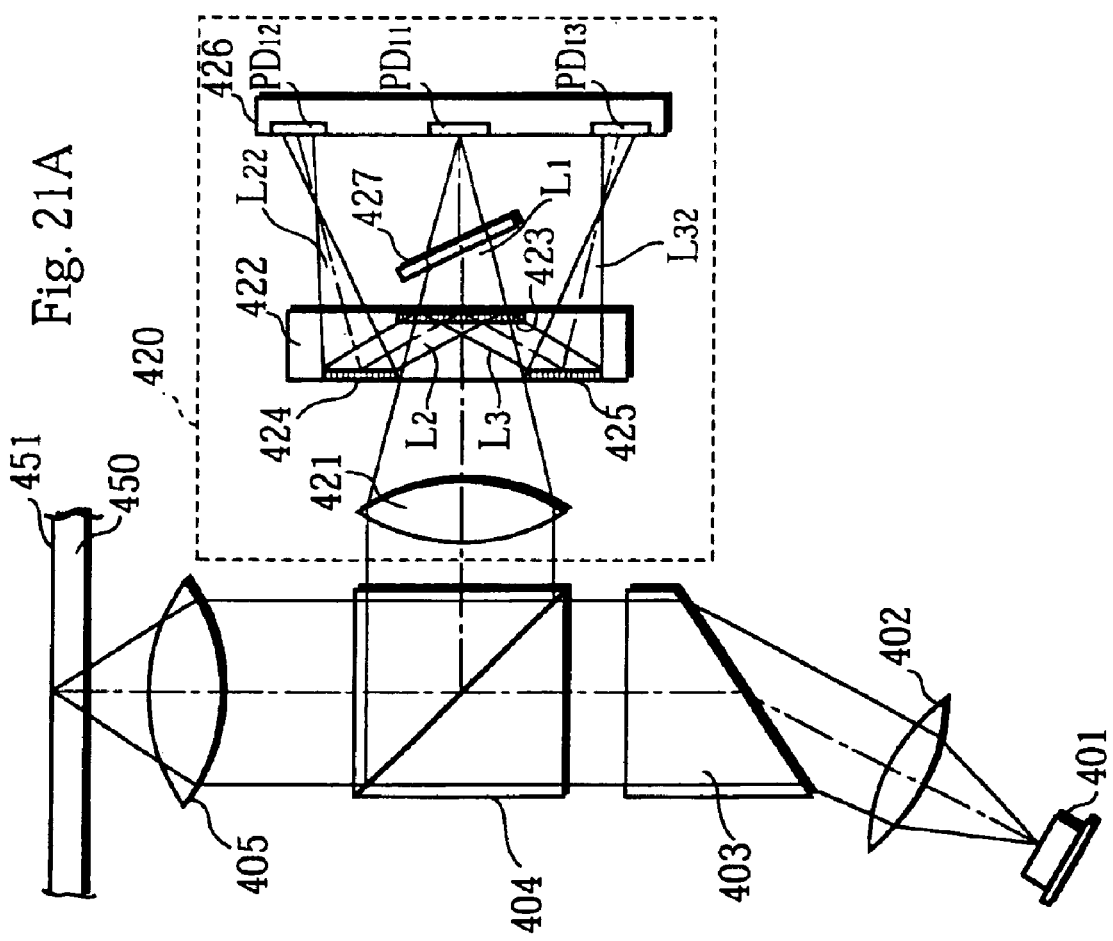

FIG. 21A shows the construction of this optical pickup. While the laser diode 401, the collimating lens 402, the beam-shaping prism 403, the polarizing beam splitter 404, and the objective lens 405 are the same as in the conventional optical pickup shown in FIG. 20, the return light detecting unit 420 greatly differs to that of the conventional optical pickup.

Laser light that has been emitted by the laser diode 401 is reflected back off the information recording surface 451. This return light is reflected by a boundary face within the polarizing beam splitter 404 and is directed toward the return light detecting unit 420. This return light detecting unit 420 includes a condenser lens 421, a diffractive optical element 422, a glass plate 427, and a photo sensor unit 426. The return light reflected by the polarizing beam splitter 404 is converted into a convergent beam by the condenser lens 421 and then enters the diffractive optical element 422.

The diffractive optical element 422 includes a reflective-polarization type diffractive optical element structure that was described earlier. A first diffractive optical element pattern 423 whose pattern pitch is no greater than the wavelength λ of the incident light is formed on the opposite main surface (hereafter "opposite surface") to the surface (hereafter "incident surface") which is incident to the return light. Second diffractive optical element patterns 424 and 425 that have a pattern pitch that is larger than the wavelength λ are formed on the incident surface of the diffractive optical element 422. The second diffractive optical element patterns 424 and 425 are positioned so as to be incident to the positive first-order diffracted light $L_2$ and the negative first-order diffracted light $L_3$. The positions of the second diffractive optical element patterns 424 and 425 are also symmetrical about the main optical axis of the return light.

The return light that is incident on the diffractive optical element 422 is split into the zero-order diffracted light $L_0$, the positive first-order diffracted light $L_2$ and the negative first-order diffracted light $L_3$ due to the diffraction caused by the first diffractive optical element pattern 423. The polarizing effect of the first diffractive optical element pattern 423 results in the zero-order diffracted light $L_0$ being P-polarized light and the positive first-order diffracted light $L_2$ and the negative first-order diffracted light $L_3$ being S-polarized light.

A diffractive optical element 422 can be produced with these characteristics by setting, when the refractive index of the glass plate is 2.4, for example, the depth of the slits in the first diffractive optical element pattern 423 at 0.3 to 0.35 times the wavelength of the incident light and the pattern pitch of the slits at 0.72 to 0.74 times the wavelength. This has been confirmed by experimentation. Suitable values for the depth of the slits and the pattern pitch can be obtained for other values of the refractive index of the glass plate through experimentation or computer simulation.

The positive first-order diffracted light $L_2$ and the negative first-order diffracted light $L_3$ are respectively second diffractive optical element patterns 424 and 425, producing the negative first-order diffracted light $L_{22}$ and $L_{32}$. This diffracted light $L_{22}$ and $L_{32}$ does not satisfy the conditions for total internal reflection and so is emitted from the same side of the diffractive optical element 422 as the zero-order diffracted light $L_1$.

The photo sensor unit 426 is produced by forming photo sensors $PD_{11}$, $PD_{12}$, and $PD_{13}$ at predetermined intervals on a silicon substrate. The photo sensor $PD_{11}$ detects the zero-order diffracted light $L_1$, while the photo sensors $PD_{12}$ and $PD_{13}$ respectively detect the negative first-order diffracted light $L_{22}$ and $L_{32}$. As shown in FIG. 21B, the centrally placed photo sensor $PD_{11}$ in the present example is a four-zone photo sensor that has four separate detection areas numbered $d_1$ to $d_4$.

The zero-order diffracted light $L_1$ is a convergent beam, so that when this diffracted light $L_1$ passes a glass plate 427 that is tilted in a first direction, the lengths of the optical paths taken by the diffracted light $L_1$ change by different amounts due the incident angle, resulting in a stigmatic aberration in the diffraction light $L_1$. This aberrated light then is detected by the four-zone photo sensor $PD_{11}$. The total of the outputs of the detection areas $d_1$ and $d_3$ is compared with the total of the outputs of the detection areas $d_2$ and $d_4$, and the focus error is detected according to a conventional astigmatic aberration method.

Here, if the direction in which a tracking error occurs is perpendicular to the page for FIG. 21B, the tracking error can be found according to a push-pull method by comparing the outputs of the detection area $d_2$ and $d_4$.

These two types of detected errors are used as servo signals to drive servo mechanisms (not illustrated) that are each composed of a magnetic coil and a magnet. In this way, the focus error and tracking error are corrected.

By finding the difference ($V_1-V_2$) between the total $V_1$ of the output values of the detection areas $d_1$ to $d_4$ of the four-zone photo sensor $PD_{11}$ and the total $V_2$ of the output values of the photo sensors $PD_{12}$ and $PD_{13}$, a read signal that suffers from little noise can be obtained.

By using a reflective-polarization type diffractive optical element of the present invention in this way, an optical pickup can be produced with fewer parts than the conventional optical pickup shown in FIG. 20. This reduces the cost of the components, while the reduction in the number of operations required for assembly and optical adjustment lowers the cost of assembly. As a further effect, the overall construction of the optical pickup can be miniaturized, which makes it easier to reduce the size of a magneto-optical disk device that includes this optical pickup.

Tenth Embodiment

Figure 22:
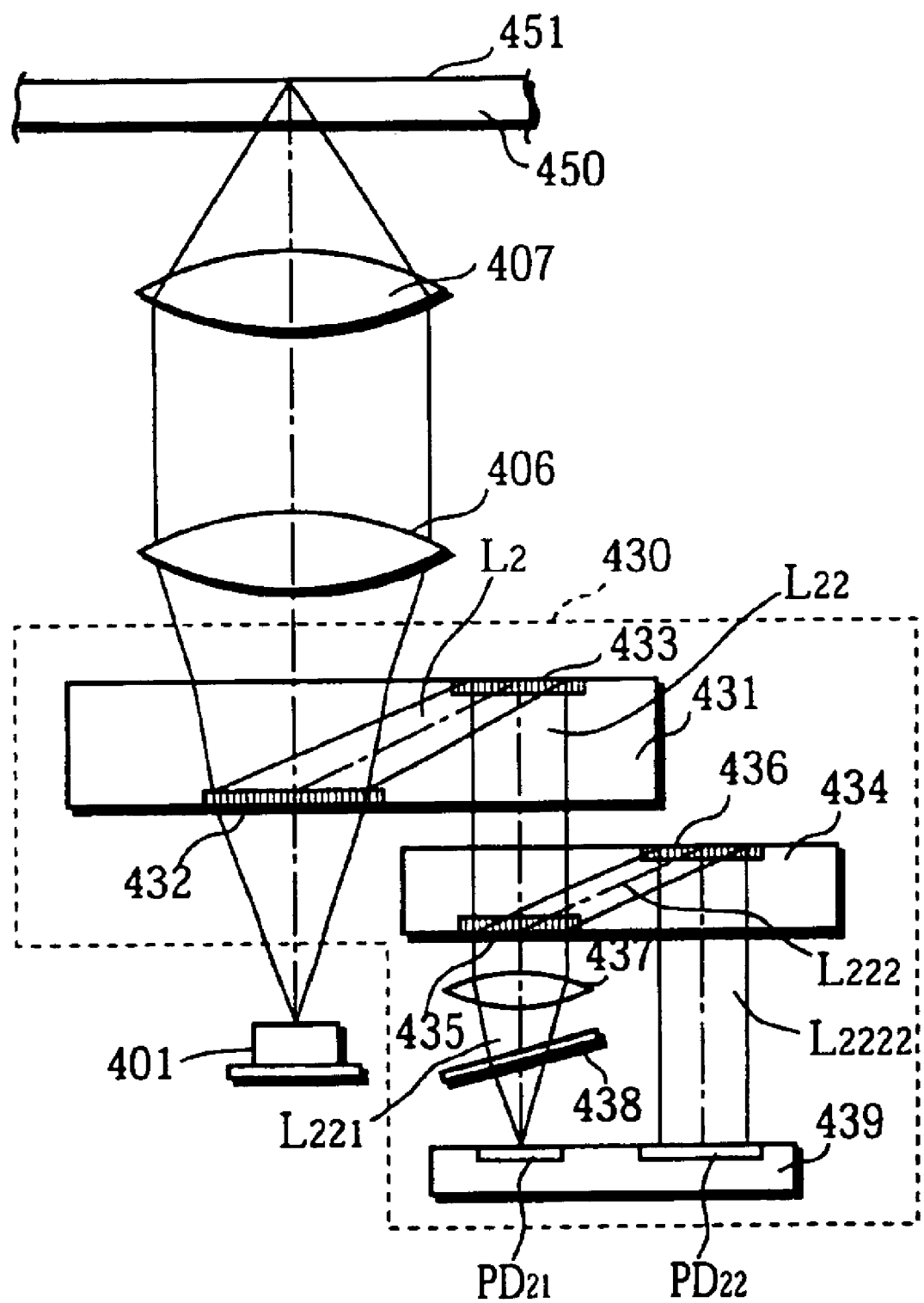
FIG. 22 shows a construction of an optical pickup that is another embodiment of the present invention.

As a tenth embodiment of the present invention, FIG. 22 shows an alternative construction for an optical pickup that uses a reflective-polarization diffractive optical element.

In this embodiment, the return light detecting unit 430 includes two diffractive optical elements numbered 431 and 434.

A diffractive optical element pattern 432 is formed on a lower main surface of the diffractive optical element 431 and is designed so as to transmit a certain proportion of incident P-polarized light. P-polarized laser light emitted by the laser diode 401 is transmitted through the diffractive optical element 431 and then collimated by the collimating lens 406 so as to become a parallel beam. This parallel beam then passes the objective lens 407, and is focused on the information recording surface 451 of the magneto-optical disk 450.

The light (return light) reflected off the information recording surface 451 has its polarizing direction rotated by the Kerr angle. This return light passes back through the objective lens 407 and the collimating lens 406, and is then reflection-diffracted by the diffractive optical element pattern 432 of the diffractive optical element 431. The positive first-order diffracted light $L_2$ produced by this diffraction is diffracted by the diffractive optical element pattern 433 to produce the negative first-order diffracted light $L_{22}$ that exits from the diffractive optical element 431.

Note that the diffractive optical element pattern 433 is composed of curved slits in the same way as the diffractive optical element pattern 18 shown in FIG. 19B, so that the negative first-order diffracted light $L_{22}$ is a parallel beam. The negative first-order diffracted light $L_{22}$ is incident on the diffractive optical element pattern 435 of the diffractive optical element 434 and so is split to produce the zero-order diffracted light $L_{221}$ (first polarized light that is P-polarized) and the positive first-order diffracted light $L_{222}$ (second polarized light that is S-polarized) that is reflection-diffracted. This positive first-order diffracted light $L_{222}$ is reflection-diffracted by the diffractive optical element pattern 436 to produce the negative first-order diffracted light $L_{2222}$ that is emitted from the second diffractive optical element 434.

The photo sensor unit 439 includes the four-zone photo sensor $PD_{21}$ and the photo sensor $PD_{22}$. The zero-order diffracted light $L_{221}$ passes though the condenser lens 437 and the astigmatic aberration-generating plate glass 438 and strikes the four-zone photo sensor $PD_{21}$. As a result, the focus error and tracking error are detected in the same way as was described for FIGS. 21A and 21B.

The negative first-order diffracted light $L_{2222}$ produced by the diffractive optical element pattern 436 strikes the photo sensor $PD_{22}$. The difference between the output of this photo sensor $PD_{22}$ and the output of the four-zone photo sensor $PD_{21}$ is found and is used to obtain the read signal for the information recording surface 451 of the magneto-optical disk 450.

If the pattern 433 is designed so as to produce a convergent beam as the negative first-order diffracted light $L_{22}$, the condenser lens 437 can be omitted from the construction. In the same way, if this pattern is designed so as to generate an astigmatic aberration, the astigmatic aberration-generating plate glass 438 can be omitted.

By constructing an optical pickup as shown in FIG. 22, the comparatively large polarizing beam splitter 404 that was included in the optical pickup of FIG. 21A can also be omitted, enabling further miniaturization of the optical pickup.

Figure 23:
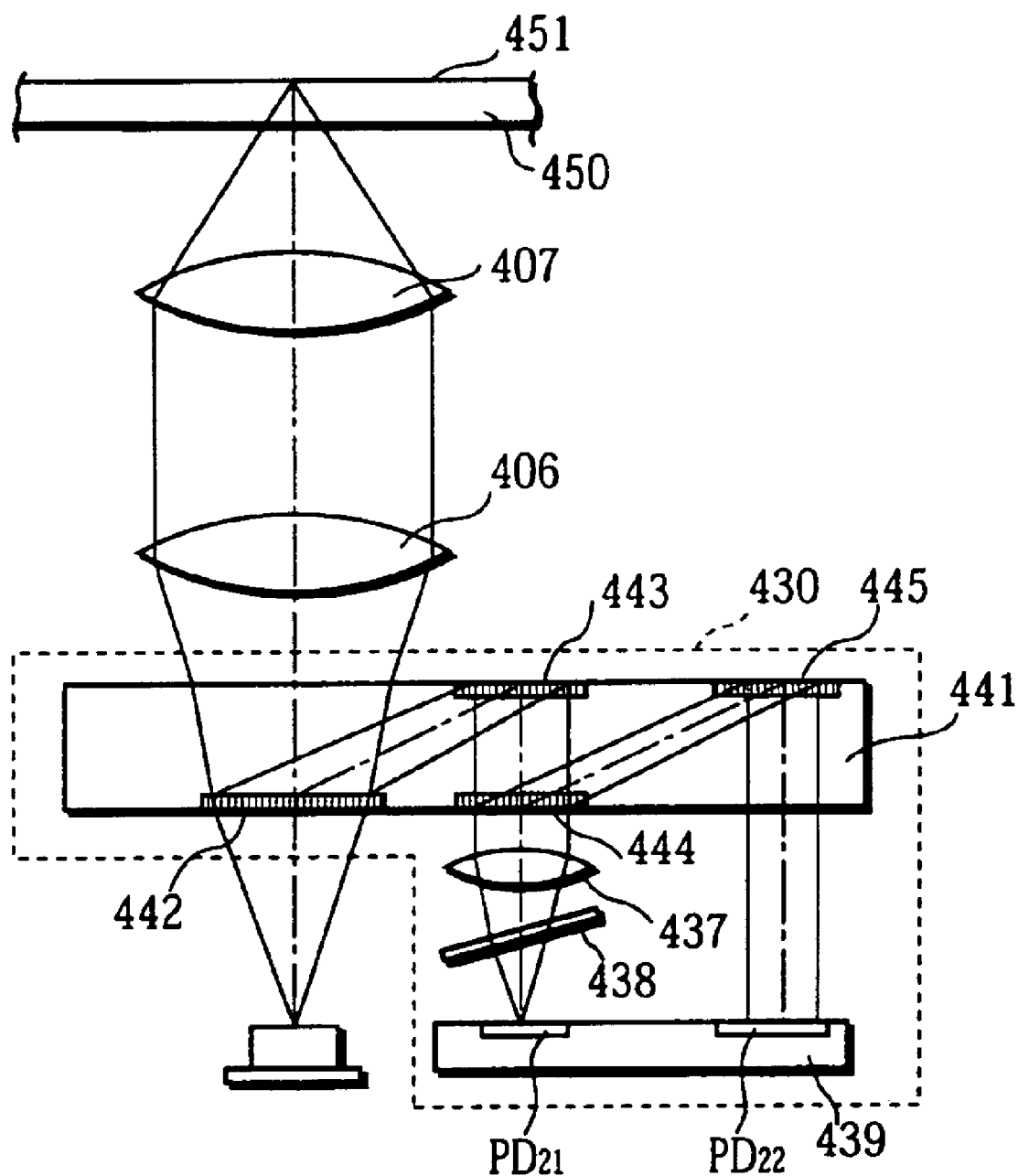
FIG. 23 shows a construction of an optical pickup that is yet another embodiment of the present invention

The first diffractive optical element 431 and second diffractive optical element 434 shown in FIG. 22 may be combined into a single element, as shown in FIG. 23. In other words, within the return light detecting unit 430, the two diffractive optical elements 431 and 434 may be replaced with a single diffractive optical element 441. Two diffractive optical element patterns can be formed on each of the upper and lower surfaces of this diffractive optical element 441, with these diffractive optical element patterns 442, 443, 444, and 445 being formed with patterns that correspond to the diffractive optical element patterns 432, 433, 435, and 436. The other components of the pickup are the same as those shown in FIG. 22, so no further explanation of this construction will be given.

By using the construction shown in FIG. 23, a further reduction can be made in the number of components used to manufacture an optical pickup. This means that an optical pickup can be made smaller and at a lower cost than the constructions shown in FIGS. 21A and 22.

Note that while the ninth and tenth embodiments describe the case where the optical pickup reads recorded information from an optical recording medium that is a magneto-optical disk, the present invention can also be applied to an optical pickup used for reading recorded information from an optical recording medium that uses reflectivity control. Such optical recording media include discs where data is recorded as pits and phase-change discs, with specific examples being a CD (Compact Disc) or a DVD (Digital Versatile Disc). In such case, the construction of the optical pickups shown in FIGS. 22 and 23 may use a value detected by the photo sensor $PD_{21}$ alone as the read signal. By changing the signal processing subsystem, the optical pickup of the present invention can be used as a dedicated optical pickup for an optical disc or can be used as an optical pickup for both optical and magneto-optical discs. In both cases, the stated effects of the reductions in size and cost can be achieved.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An optical pickup that optically reads information that has been recorded on an optical recording medium, comprising:

laser beam exposing means which includes a light source that emits a laser beam and focuses the laser beam on an information recording surface of the optical recording medium;

a first polarizing beam splitter for splitting light reflected back off the information recording surface into first polarized light and second polarized light that is polarized in a different direction to the first polarized light; and photoelectric conversion means for receiving the first polarized light and the second polarized light and converting the first polarized light and the second polarized light into electrical signals, wherein the first polarizing beam splitter includes:

a first substrate with a first main surface and a second main surface, a refractive index of the substrate being equal to n where n is a value greater than one;

a first diffractive optical element pattern that is formed on part of the first main surface with a pattern pitch Λ such that $\lambda/n < \Lambda \leq \lambda$, where λ is a wavelength of the reflected light; and a second diffractive optical element pattern that is formed on one of the first main surface and the second main surface at a predetermined position on an optical path that diffracted light produced by the first diffractive optical element pattern takes within the first substrate.

2. An optical pickup according to claim 1, further comprising a second polarizing beam splitter, positioned on an optical path between the light source and the information recording surface, for transmitting the laser beam emitted by the light source and redirecting the reflected light toward the first polarizing beam splitter, the second polarizing beam splitter including:

a second substrate with a first main surface and a second main surface, a refractive index of the substrate being equal to n' where n' is a value greater than one;

a third diffractive optical element pattern that is formed on part of the first main surface of the second substrate with a pattern pitch Λ' such that such that $\lambda/n' < \Lambda' \leq \lambda$; and a fourth diffractive optical element pattern that is formed on one of the first main surface and the second main surface of the second substrate at a predetermined position on an optical path that diffracted light produced by the third diffractive optical element pattern takes within the second substrate.

3. An optical pickup according to claim 2, wherein the first substrate and second substrate are a single substrate, the first diffractive optical element pattern is formed on one of the first main surface and the second main surface at a position that is incident to diffracted light produced by the fourth diffractive optical element pattern.

4. An optical pickup that optically reads information that has been recorded on an optical recording medium, comprising:

a light source unit that emits a laser beam and focuses the laser beam on an information recording surface of the optical recording medium;

a first polarizing beam splitter for splitting light reflected back off the information recording surface into first polarized light and second polarized light that is polarized in a different direction to the first polarized light; and photoelectric conversion unit that receives the first polarized light and the second polarized light and converts the first polarized light and the second polarized light into electrical signals, wherein the first polarizing beam splitter includes:

a first substrate with a first main surface and a second main surface, a refractive index of the substrate being equal to n where n is a value greater than one;

a first diffractive optical element pattern that is formed on part of the first main surface with a pattern pitch Λ such that $\lambda/n < \Lambda \leq \lambda$, where λ is a wavelength of the reflected light; and a second diffractive optical element pattern that is formed on one of the first main surface and the second main surface at a predetermined position on an optical path that diffracted light produced by the first diffractive optical element pattern takes within the first substrate.

5. An optical pickup assembly that reads information recorded on an optical recording medium, comprising:

a light source that emits a light beam that is focused on the optical recording medium to enable an interaction with information recorded on the optical recording medium;

a transparent solid substrate having first and second main surfaces for converting the light from the optical recording medium into polarized light; and a conversion unit that receives light from the optical recording medium and converts the received light into electrical signals that can be processed to provide the recorded information;

the transparent solid substrate including a first polarizing diffractive optical element pattern formed in the first main surface with a pattern pitch no greater than a wavelength $\lambda$ of incident light to provide a first production of zero-order diffracted light and a first order diffracted light; and a second diffractive optical element pattern formed in the second main surface and laterally offset from the first polarizing diffractive optical element to receive only the first production of first order diffracted light, the second diffractive optical element has a pattern pitch greater than the wavelength $\lambda$ of incident light to provide a second production of a pair of polarized first order diffracted light rays, one of which will be transmitted through the first main surface and the other which will be internally reflected between the first and second main surfaces.

6. The optical pickup assembly of claim 5 wherein the substrate is a plate of glass and the patterns have a rectangular cross section.

7. The optical pickup assembly of claim 5 further including a third diffractive optical element pattern formed in the second main surface and laterally offset from the first diffractive optical element to receive only a first production of negative first-order diffractive light, the second diffractive optical element pattern receiving only the first production of positive first-order diffractive light, the third diffractive optical element has a pattern pitch greater than the wavelength $\lambda$ of incident light to provide a second production of a pair of polarized first-order diffracted light rays, one of which will be transmitted through the first main surface and the other which will be internally reflected between the first and second main surfaces.

8. The optical pickup assembly of claim 7 wherein the optical element is a polarizing beam splitter.

9. The optical pickup assembly of claim 8 wherein the zero-order diffracted light from the first polarizing optical element is transmitted on the same optical axis as the incident light through the second main surface and the pattern pitch of the second diffractive optical element pattern is the same as the pattern pitch of the third diffractive optical element pattern.

* * * * *